(12) United States Patent
Huang et al.

(10) Patent No.: US 12,712,607 B2
(45) Date of Patent: Aug. 18, 2026

(54) UPLINK MULTIPLE-INPUT MULTIPLE-OUTPUT WITH DIFFERENT ANTENNA GROUPS

(71) Applicant: QUALCOMM INCORPORATED, San Diego, CA (US)

(72) Inventors: Yi Huang, San Diego, CA (US); Hyojin Lee, San Diego, CA (US); Yu Zhang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 144 days.

(21) Appl. No.: 18/570,574

(22) PCT Filed: Aug. 11, 2021

(86) PCT No.: PCT/CN2021/112018
§ 371 (c)(1),
(2) Date: Dec. 14, 2023

(87) PCT Pub. No.: WO2023/015479
PCT Pub. Date: Feb. 16, 2023

(65) Prior Publication Data
US 2024/0297688 A1 Sep. 5, 2024

(51) Int. Cl.
*H04B 7/06* (2006.01)
*H04B 7/0456* (2017.01)

(52) U.S. Cl.
CPC ......... *H04B 7/0456* (2013.01); *H04B 7/0691* (2013.01)

(58) Field of Classification Search
CPC ... H04B 1/00; H04B 7/00; H04B 7/04; H04B 7/06; H04B 7/0691; H04B 7/0413;
(Continued)

(56) References Cited

U.S. PATENT DOCUMENTS 8,380,135 B2 * 2/2013 Ko ........................ H04B 7/0691 455/68
11,647,467 B2 * 5/2023 Rahman ................ H04W 52/38 370/329

(Continued)

FOREIGN PATENT DOCUMENTS

WO WO-2020209597 A1 10/2020

OTHER PUBLICATIONS

International Search Report and Written Opinion—PCT/CN2021/112018—ISA/EPO—Apr. 20, 2022.

(Continued)

*Primary Examiner* — Shawkat M Ali
(74) *Attorney, Agent, or Firm* — Holland & Hart LLP

(57) ABSTRACT

Methods, systems, and devices for wireless communications are described. Generally, the described techniques provide for activating antenna groups at a user equipment (UE) for communications with a base station. The UE may receive an indication of at least one active antenna group for communications with the base station, and the UE may map one or more layers of an uplink message to the at least one active antenna group. The UE may then transmit the one or more layers of the uplink message using the at least one active antenna group based on the mapping. In some cases, the UE may transmit a capability report to the base station indicating one or more antennas in each antenna group in a set of antenna groups at the UE, and the base station may activate the at least one active antenna group from the set of antenna groups.

36 Claims, 17 Drawing Sheets

(58) Field of Classification Search

CPC .. H04B 7/0417; H04B 7/0452; H04B 7/0456; H04L 5/00; H04L 5/12; H04W 8/24; H04W 16/28; H04W 24/10; H04W 52/36; H04W 52/42; H04W 72/08

USPC ......... 370/204, 329; 375/219, 259–260, 262, 375/267, 295, 316

See application file for complete search history.

(56) References Cited

U.S. PATENT DOCUMENTS

| | | | | |
|---|---|---|---|---|
| 2017/0366235 | A1* | 12/2017 | Kim | H04B 7/0626 |
| 2018/0278312 | A1* | 9/2018 | Frenne | H04L 5/0048 |
| 2020/0106168 | A1* | 4/2020 | Hakola | H04B 7/088 |

OTHER PUBLICATIONS

Partial International Search Report—PCT/CN2021/112018—ISA/EPO—Feb. 28, 2022.

ZTE: "Enhancements on Multi-Beam Operation", 3GPP Draft, 3GPP TSG RAN WG1 Meeting #96bis, R1-1904014, Enhancements on Multi-Beam Operation, 3rd Generation Partnership Project (3GPP), Mobile Competence Centre, 650, Route Des Lucioles, F-06921 Sophia- Antipolis Cedex, France, vol. RAN WG1, No. Xian, China, Apr. 8, 2019-Apr. 12, 2019, Mar. 30, 2019 (Mar. 30, 2019), XP051691228, 17 pages.

Zte, et al., "Uplink Enhancements for 5G Advanced", 3GPP Draft, 3GPP TSG RAN Rel-18 Workshop, RWS-210479, 3rd Generation Partnership Project (3GPP), Mobile Competence Centre, 650, Route Des Lucioles, F-06921 Sophia-Antipolis Cedex, France, vol. TSG RAN, No. Electronic Meeting, Jun. 28, 2021-Jul. 2, 2021 Jun. 7, 2021 (Jun. 7, 2021), XP052026030, 10 Pages, p. 9.

* cited by examiner

200

300

Panel 1

0 1

4 5

400-b 600-b

800

1400

Transmit, to a UE, an indication of at least one active antenna group of a plurality of antenna groups for communications with the base station, wherein the UE comprises a plurality of antennas from a plurality of antenna panels and each of the plurality of antenna groups comprises a subset of the plurality of antennas

1705

Receive, from the UE, one or more layers of an uplink message mapped to the at least one active antenna group based at least in part on transmitting the indication of the at least one active antenna group

1710

FIG. 17

UPLINK MULTIPLE-INPUT MULTIPLE-OUTPUT WITH DIFFERENT ANTENNA GROUPS

CROSS REFERENCE

The present Application is a 371 national stage filing of International PCT Application No. PCT/CN2021/112018 by HUANG et al. entitled "UPLINK MULTIPLE-INPUT MULTIPLE-OUTPUT WITH DIFFERENT ANTENNA GROUPS," filed Aug. 11, 2021, which is assigned to the assignee hereof, and which is expressly incorporated by reference in its entirety herein.

FIELD OF TECHNOLOGY

The following relates to wireless communications, including uplink multi-input multi-output with different antenna groups.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may communicate with a base station using multiple antenna groups or panels, and in some cases ports on different panels may be non-coherent, or the antenna groups on different panels may be heterogenous. These antenna groups or heterogeneous panels may refer to different panels at the UE, and the different panels at the UE may include different combinations of antennas, different configurations, etc. Improved techniques at a UE for communicating using multiple antenna groups or heterogeneous panels may be desirable.

SUMMARY

The described techniques relate to improved methods, systems, devices, and apparatuses that support uplink multi-input multi-output (MIMO) with different antenna groups. Generally, the described techniques provide for activating antenna groups at a user equipment (UE) for communications with a base station. The UE may receive an indication of at least one active antenna group for communications with the base station, and the UE may map one or more layers of an uplink message to the at least one active antenna group. The UE may then transmit the one or more layers of the uplink message using the at least one active antenna group based on the mapping. In some cases, the UE may transmit a capability report to the base station indicating one or more antennas in each antenna group in a set of antenna groups at the UE, and the base station may transmit signaling to activate the at least one active antenna group from the set of antenna groups.

A method for wireless communication at a user equipment (UE) is described. The method may include receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas, mapping one or more layers of an uplink message to the at least one active antenna group based on receiving the indication of the at least one active antenna group, and transmitting, to the base station, the one or more layers of the uplink message using the at least one active antenna group based on the mapping.

An apparatus for wireless communication at a UE is described. The apparatus may include a processor, memory coupled with the processor, and instructions stored in the memory. The instructions may be executable by the processor to cause the apparatus to receive, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas, map one or more layers of an uplink message to the at least one active antenna group based on receiving the indication of the at least one active antenna group, and transmit, to the base station, the one or more layers of the uplink message using the at least one active antenna group based on the mapping.

Another apparatus for wireless communication at a UE is described. The apparatus may include means for receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas, means for mapping one or more layers of an uplink message to the at least one active antenna group based on receiving the indication of the at least one active antenna group, and means for transmitting, to the base station, the one or more layers of the uplink message using the at least one active antenna group based on the mapping.

A non-transitory computer-readable medium storing code for wireless communication at a UE is described. The code may include instructions executable by a processor to receive, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas, map one or more layers of an uplink message to the at least one active antenna group based on receiving the indication of the at least one active antenna group, and transmit, to the base station, the one or more layers of the uplink message using the at least one active antenna group based on the mapping.

Some examples of the method, apparatuses, and non-transitory computer-readable medium described herein may further include operations, features, means, or instructions for receiving, from the base station, a transmit precoding matrix indicator for each active antenna group of the at least one active antenna group and precoding the one or more layers of the uplink message mapped to each active antenna group based on a respective transmit precoding matrix indicator.

In some examples of the method, apparatuses, and non-transitory computer-readable medium described herein, receiving the transmit precoding matrix indicator for each active antenna group may include operations, features, means, or instructions for receiving the transmit precoding matrix indicator for each active antenna group in a downlink control information message.

Some examples of the method, apparatuses, and non-transitory computer-readable medium described herein may further include operations, features, means, or instructions for receiving, from the base station, an indication of a quantity of the one or more layers of the uplink message, where mapping the one or more layers of the uplink message may be based on receiving the indication of the quantity of the one or more layers of the uplink message.

Some examples of the method, apparatuses, and non-transitory computer-readable medium described herein may further include operations, features, means, or instructions for transmitting, to the base station, a capability report indicating one or more antennas in each of the set of multiple antenna groups, where receiving the indication of the at least one active antenna group may be based on transmitting the capability report.

Some examples of the method, apparatuses, and non-transitory computer-readable medium described herein may further include operations, features, means, or instructions for transmitting, in the capability report, an indication of whether the UE may be capable of performing coherent transmissions using one or more sets of antennas in each antenna group.

In some examples of the method, apparatuses, and non-transitory computer-readable medium described herein, the mapping of the one or more layers of the uplink message to the at least one active antenna group may be defined at the UE.

In some examples of the method, apparatuses, and non-transitory computer-readable medium described herein, a quantity of the one or more layers of the uplink message, L, may be greater than or equal to a quantity of the at least one active antenna group, N, and the mapping may be based on a mapping rule that maps a layer with index 1 to an active antenna group with index 1 mod N.

In some examples of the method, apparatuses, and non-transitory computer-readable medium described herein, a quantity of the one or more layers of the uplink message, L, may be less than a quantity of the at least one active antenna group, N, and the mapping may be based on a mapping rule that maps an active antenna group with index n to a layer with index n mod L.

Some examples of the method, apparatuses, and non-transitory computer-readable medium described herein may further include operations, features, means, or instructions for receiving an indication of the mapping of the one or more layers of the uplink message to the at least one active antenna group.

In some examples of the method, apparatuses, and non-transitory computer-readable medium described herein, receiving the indication of the mapping rule may include operations, features, means, or instructions for receiving the indication of the mapping in a downlink control information message, a radio resource control message, or a medium access control control element.

In some examples of the method, apparatuses, and non-transitory computer-readable medium described herein, receiving the indication of the at least one active antenna group of the set of multiple antenna groups may include operations, features, means, or instructions for receiving the indication of the at least one active antenna group of the set of multiple antenna groups in a downlink control information message, a radio resource control message, or a medium access control control element.

In some examples of the method, apparatuses, and non-transitory computer-readable medium described herein, the indication of the at least one active antenna group of the set of multiple antenna groups includes a bitmap indicating the at least one active antenna group of the set of multiple antenna groups.

In some examples of the method, apparatuses, and non-transitory computer-readable medium described herein, the UE includes a virtual UE, and the set of multiple antenna groups at the UE includes antenna groups at one or more physical UEs.

A method for wireless communication at a base station is described. The method may include transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas and receiving, from the UE, one or more layers of an uplink message mapped to the at least one active antenna group based on transmitting the indication of the at least one active antenna group.

An apparatus for wireless communication at a base station is described. The apparatus may include a processor, memory coupled with the processor, and instructions stored in the memory. The instructions may be executable by the processor to cause the apparatus to transmit, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas and receive, from the UE, one or more layers of an uplink message mapped to the at least one active antenna group based on transmitting the indication of the at least one active antenna group.

Another apparatus for wireless communication at a base station is described. The apparatus may include means for transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas and means for receiving, from the UE, one or more layers of an uplink message mapped to the at least one active antenna group based on transmitting the indication of the at least one active antenna group.

A non-transitory computer-readable medium storing code for wireless communication at a base station is described. The code may include instructions executable by a processor to transmit, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas and receive, from the UE, one or more layers of an uplink message mapped to the at least one active antenna group based on transmitting the indication of the at least one active antenna group.

Some examples of the method, apparatuses, and non-transitory computer-readable medium described herein may further include operations, features, means, or instructions for transmitting, to the UE, a transmit precoding matrix indicator for each active antenna group of the at least one active antenna group and decoding the one or more layers of the uplink message mapped to each active antenna group based on a respective transmit precoding matrix indicator.

In some examples of the method, apparatuses, and non-transitory computer-readable medium described herein, transmitting the transmit precoding matrix indicator for each active antenna group may include operations, features, means, or instructions for transmitting the transmit precoding matrix indicator for each active antenna group in a downlink control information message.

Some examples of the method, apparatuses, and non-transitory computer-readable medium described herein may further include operations, features, means, or instructions for transmitting, to the UE, an indication of a quantity of the one or more layers of the uplink message, where receiving the one or more layers of the uplink message may be based on transmitting the indication of the quantity of the one or more layers of the uplink message.

Some examples of the method, apparatuses, and non-transitory computer-readable medium described herein may further include operations, features, means, or instructions for receiving, from the UE, a capability report indicating one or more antennas in each of the set of multiple antenna groups, where transmitting the indication of the at least one active antenna group may be based on receiving the capability report.

Some examples of the method, apparatuses, and non-transitory computer-readable medium described herein may further include operations, features, means, or instructions for receiving, in the capability report, an indication of whether the UE may be capable of performing coherent transmissions using one or more sets of antennas in each antenna group.

Some examples of the method, apparatuses, and non-transitory computer-readable medium described herein may further include operations, features, means, or instructions for transmitting an indication of a mapping of the one or more layers of the uplink message to the at least one active antenna group.

In some examples of the method, apparatuses, and non-transitory computer-readable medium described herein, transmitting the indication of the mapping rule may include operations, features, means, or instructions for transmitting the indication of the mapping in a downlink control information message, a radio resource control message, or a medium access control control element.

In some examples of the method, apparatuses, and non-transitory computer-readable medium described herein, transmitting the indication of the at least one active antenna group of the set of multiple antenna groups may include operations, features, means, or instructions for transmitting the indication of the at least one active antenna group of the set of multiple antenna groups in a downlink control information message, a radio resource control message, or a medium access control control element.

In some examples of the method, apparatuses, and non-transitory computer-readable medium described herein, the indication of the at least one active antenna group of the set of multiple antenna groups includes a bitmap indicating the at least one active antenna group of the set of multiple antenna groups.

In some examples of the method, apparatuses, and non-transitory computer-readable medium described herein, the UE includes a virtual UE, and the set of multiple antenna groups at the UE includes antenna groups at one or more physical UEs.

BRIEF DESCRIPTION OF THE DRAWINGS

FIGS. 16 and 17 show flowcharts illustrating methods that support uplink MIMO with different antenna groups in accordance with aspects of the present disclosure.

DETAILED DESCRIPTION

In some wireless communications systems, a user equipment (UE) may communicate with a base station using multiple antennas. Such communications using multiple antennas may be referred to as multi-input multi-output (MIMO) communications. Because MIMO communications may utilize multiple antennas for communications with a base station, throughput between the UE and the base station may be improved. To further improve throughput, the UE may also support communications with the base station using multiple antenna groups, where each antenna group includes a subset of the antennas at the UE. For instance, a virtual UE may utilize antenna groups at multiple physical UEs for communications with a base station to improve throughput. In some cases, however, it may be challenging for the UE to manage multiple antenna groups and coordinate communications using these antenna groups.

As described herein, a wireless communications system may support efficient techniques to facilitate communications with a UE using multiple antenna groups or heterogeneous panels. In one aspect, the described techniques provide for activating antenna groups at a UE for communications with a base station (e.g., to limit a number of antenna groups managed by the UE and used for communications with the base station). The UE may receive an indication of at least one active antenna group for communications with the base station, and the UE may map one or more layers of an uplink message to the at least one active antenna group. The UE may then transmit the one or more layers of the uplink message using the at least one active antenna group based on the mapping. In some cases, the UE may transmit a capability report to the base station indicating one or more antennas in each antenna group in a set of antenna groups at the UE, and the base station may transmit signaling to activate the at least one active antenna group from the set of antenna groups.

Aspects of the disclosure are initially described in the context of wireless communications systems. Examples of processes and signaling exchanges that support uplink MIMO with different antenna groups are then described. Aspects of the disclosure are further illustrated by and described with reference to apparatus diagrams, system diagrams, and flowcharts that relate to uplink MIMO with different antenna groups.

Figure 1:
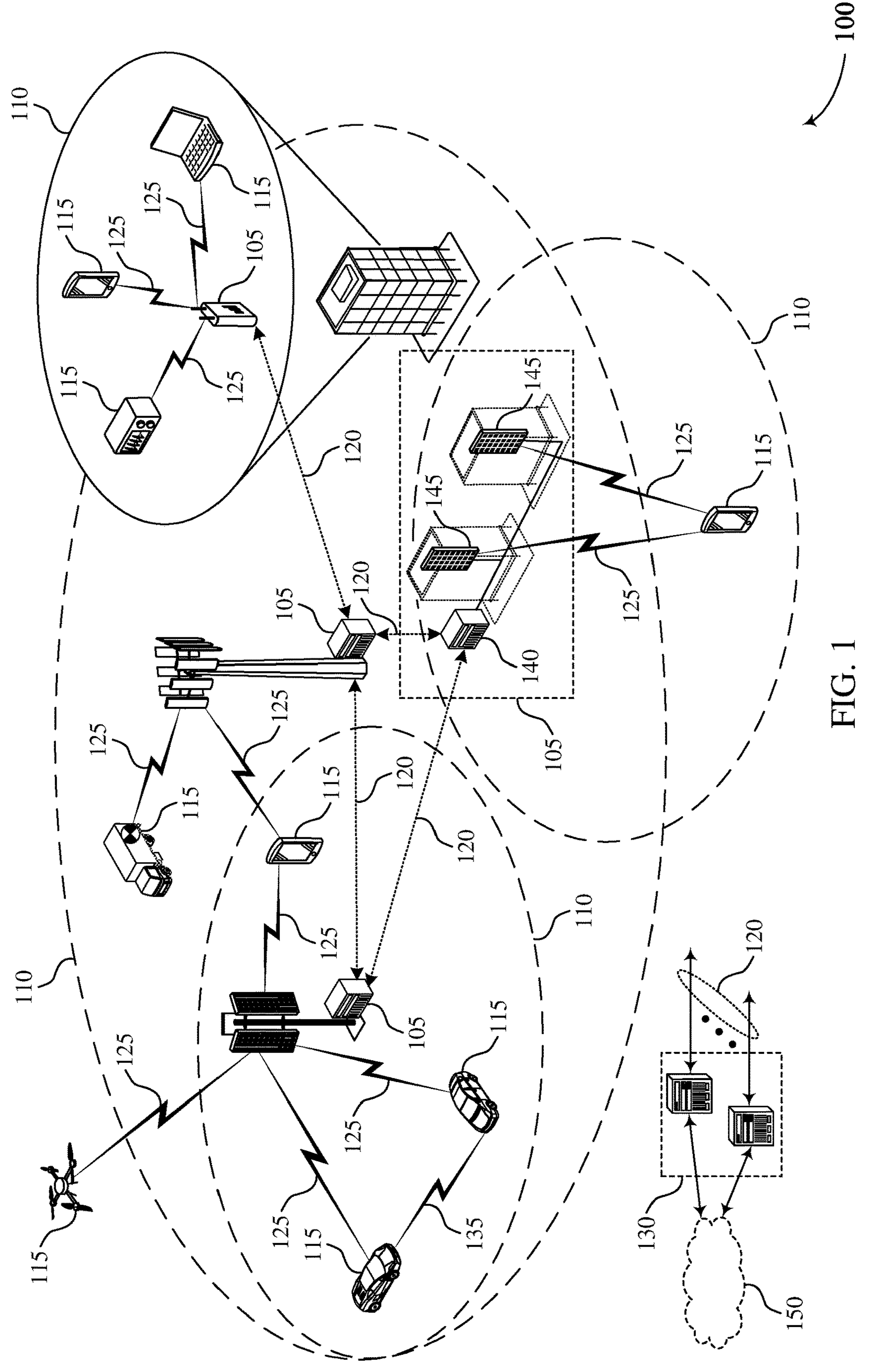
FIG. 1 illustrates an example of a wireless communications system that supports uplink multi-input multi-output (MIMO) with different antenna groups in accordance with aspects of the present disclosure.

FIG. 1 illustrates an example of a wireless communications system 100 that supports uplink MIMO with different antenna groups in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, a UE 115 may communicate with a base station 105 using multiple antennas. As mentioned, such communications using multiple antennas may be referred to as MIMO communications. Because MIMO communications may utilize multiple antennas for communications with a base station 105, throughput between the UE 115 and the base station 105 may be improved. To further improve throughput, the UE 115 may also support communications with the base station using multiple antenna groups, where each antenna group includes a subset of the antennas at the UE 115. For instance, a virtual UE 115 may utilize antenna groups at multiple physical UEs 115 for communications with a base station 105 to improve throughput. Specifically, UE aggregation may be used to aggregate transmitters or receivers or multiple UEs 115 to form a more capable virtual UE 115.

Figure 2:
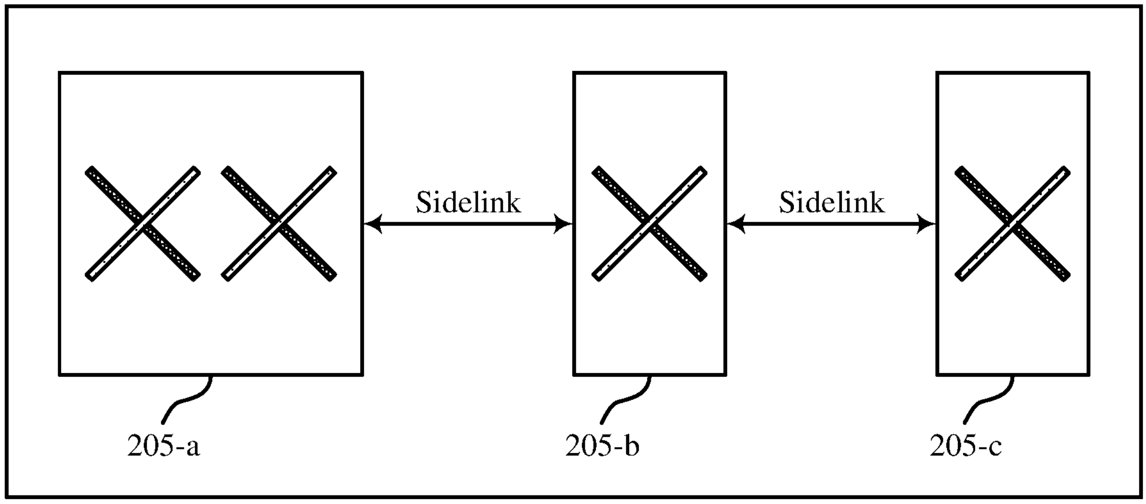
FIG. 2 illustrates an example of a virtual user equipment (UE) that supports uplink MIMO with different antenna groups in accordance with aspects of the present disclosure.

FIG. 2 illustrates an example of a virtual UE 200 that supports uplink MIMO with different antenna groups in accordance with aspects of the present disclosure. The virtual UE 200 may support communications with multiple antenna groups or heterogeneous panels 205. These antenna groups or heterogeneous panels 205 may refer to different panels at the virtual UE 200, and the different panels may include different combinations of antennas, different configurations of antennas, etc. In the example of FIG. 2, the virtual UE 200 may support communications using a first antenna group or panel 205-*a* (e.g., at a first UE 115 with a panel of four transmit ports), a second antenna group or panel 205-*b* (e.g., at a second UE 115 with a panel of two transmit ports), or a third antenna group or panel 205-*c* (e.g., at a third UE 115 with a panel of two transmit ports). Each of the antenna groups or panels 205 may be at a different physical UE 115. For instance, each UE 115 (e.g., physical UE 115) may have an uplink transmit panel, and an aggregated uplink transmit panel for the aggregated virtual UE 200 may consist of multiple heterogeneous panels (e.g., where the aggregated virtual UE 200 consists of any one or combination of a first UE 115, a second UE 115, or a third UE 115).

In some cases, however, it may be challenging for a virtual UE 115 to manage multiple antenna groups and coordinate communications using these antenna groups. For instance, although the virtual UE 115 may refer to multiple, aggregated physical UEs 115, at least one of the physical UEs 115 may coordinate transmissions from the virtual UE 115. The physical UE 115 may coordinate transmissions from the virtual UE 115 (e.g., including multiple physical UEs 115) over a sidelink connection (e.g., Bluetooth, Wi-Fi, NR sidelink, or any other sidelink connection). Thus, the complexity at the coordinating UE 115 may be high, and this high complexity may be detrimental to the UE 115. For instance, the high complexity at the UE 115 may increase power consumption at the UE 115 and consume excessive processing time and processing power at the UE 115, resulting in a worsened user experience. The wireless communications system 100 may support efficient techniques for facilitating communications with a UE 115 utilizing multiple antenna groups or heterogeneous panels.

Figure 3:
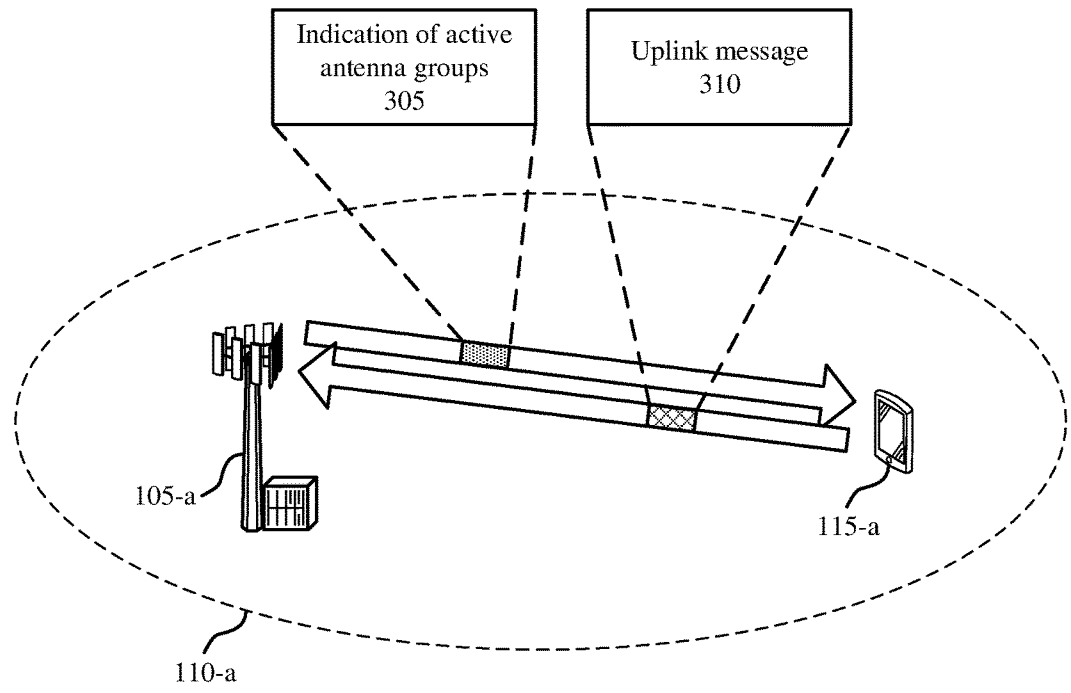
FIG. 3 illustrates an example of a wireless communications system that supports uplink MIMO with different antenna groups in accordance with aspects of the present disclosure.

FIG. 3 illustrates an example of a wireless communications system 300 that supports uplink MIMO with different antenna groups in accordance with aspects of the present disclosure. The wireless communications system 300 includes a UE 115-*a*, which may be an example of a UE 115 described with reference to FIGS. 1 and 2. The UE 115-*a* may be a virtual UE 115 and may include antenna groups (e.g., support communication using antenna groups) at one or more physical UEs 115. The wireless communications system also includes a base station 105-*a*, which may be an example of a base station 105 described with reference to FIGS. 1 and 2. The wireless communications system 300 may implement aspects of the wireless communications system 100. For example, the wireless communications system 300 may support efficient techniques for facilitating communications with the UE 115-*a* utilizing multiple antenna groups or heterogeneous panels. The communications with the UE 115-*a* may be communications between the UE 115-*a* and the base station 105-*a* or communications between the UE 115-*a* and another device (e.g., another UE 115).

The UE 115-*a* may support communications using multiple antenna groups or heterogeneous panels to improve throughput for communications with the base station 105-*a*.

Figure 4:
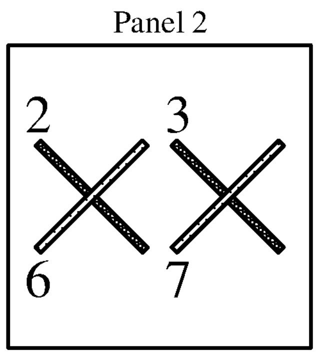
FIG. 4 illustrates an example of panels at a UE in accordance with aspects of the present disclosure.
Figure 4:
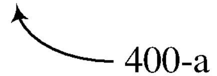
Figure 4:
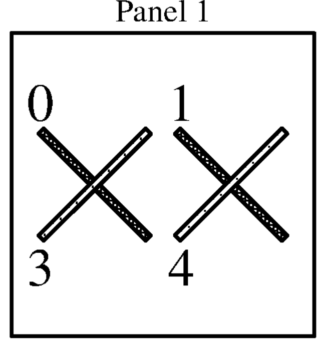
Figure 4:
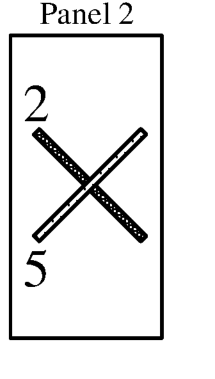

FIG. 4 illustrates an example of panels 400 at the UE 115-*a* in accordance with aspects of the present disclosure. The antennas in each panel may be referred to as an antenna group or a subgroup. In a first example 400-*a*, the UE 115-*a* may have access to a first panel with four antennas and a second panel with four antennas for communications with the base station 105-*a*. In a second example 400-*b*, the UE 115-*a* may have access to a first panel with four antennas and a second panel with two antennas for communications with the base station 105-*a*. The first and second panels in each of the examples 400 may be non-coherent to each other, and, antennas (or ports) within each panel may or may not be coherent to each other. In some examples, coherent panels may refer to panels that include antennas that may be used for a coherent transmission from the UE 115-*a*, and coherent antennas may refer to antennas that may be used for a coherent transmission from the UE 115-*a*. A coherent transmission may refer to a transmission where a phase difference of transmissions from multiple antennas may be preserved across time with a certain tolerance error range (e.g., a tolerance error that is below a threshold).

In some cases, the UE 115-*a* may transmit a capability report to the base station 105-*a* to indicate the antenna groups supported by the UE 115-*a* (e.g., the ports subgrouping or partitioning) and to indicate a coherence relation within each antenna group (e.g., subgroup). In the first example 400-*a*, a first antenna group at the UE 115-*a* may include antennas 0, 1, 4, 5 (e.g., subgroup 1={0 1, 4, 5}), and a second antenna group at the UE 115-*a* may include antennas 2, 3, 6, and 7 (e.g., subgroup 2={2, 3, 6, 7}). Further, the first subgroup may be a fully coherent subgroup (e.g., antennas {0 1, 4, 5} may be fully coherent), but the second subgroup may be a partially coherent subgroup (e.g., antennas {2, 6} and antennas {3, 7} may not be coherent). Thus, the UE 115-*a* may transmit an indication in the capability report that antennas {0 1, 4, 5} are in a first antenna group and antennas {2, 3, 6, 7} are in a second antenna group, and the UE 115-*a* may transmit an indication in the capability report that antennas {0 1, 4, 5} are coherent, antennas {2, 6} are coherent, and antennas {3, 7} are coherent.

Once the base station 105-*a* is able to identify antenna groups at the UE 115-*a* (e.g., based on the capability report or otherwise), the base station 105-*a* may transmit an indication 305 to the UE 115-*a* of active antenna groups (e.g., a list of active antenna groups) for communications with the base station 105-*a* (or another device). In some examples, the base station 105-*a* may transmit the indication 305 of active antenna groups in DCI (e.g., a scheduling DCI or a DCI scheduling the uplink message 310). For instance, a "precoding information and number of layers" field in DCI may be extended to indicate the active antenna groups. The "precoding information and number of layers" field may also indicate a number of layers for an uplink message 310 and a transmit precoding matrix indicator (TPMI) for each antenna group.

In other examples, the base station 105-*a* may transmit the indication 305 of active antenna groups in other signaling (e.g., RRC signaling or in a MAC control element (MAC-CE)). The other signaling may be a part of two-step signaling since the base station 105-*a* may still signal the number of layers and TPMI indices in DCI, since it may be appropriate for the base station 105-*a* to change a rank and a precoder frequently (e.g., to match channel fading). The base station 105-*a* may use the other signaling if it is suitable to activate and deactivate antenna groups relatively infrequently (e.g., if panel on/off is relatively slow, compared to indicating TPMIs and layers in DCI).

In any case, the base station 105-*a* may indicate, to the UE 115-*a*, a number of layers for the uplink message 310, at least one active antenna group (e.g., which subgroup out of all subgroups are active), and a TPMI index for the active antenna groups (e.g., subgroups).

As an example, the base station 105-*a* may transmit a bitmap indicating the at least one active antenna group. A bitmap of (1,0) may indicate that a first antenna group is active and a second antenna group is inactive, a bitmap of (1,1) may indicate that both a first antenna group and a second antenna group are active, and a bitmap of (0,1) may indicate that a first antenna group is inactive and a second antenna group is active (e.g., if there are a total of two antenna groups or subgroups). Similarly, a bitmap of (1, 0, 0) may indicate that a first antenna group is active and second and third antenna groups are inactive, a bitmap of (1, 0, 1) may indicate that first and third antenna groups are active and a second antenna group is inactive, and a bitmap of (1,1,1) may indicate that first, second, and third antenna groups are active (e.g., if there are a total of three antenna groups or subgroups).

In some cases, the base station 105-*a* may also indicate the TPMI index for each active antenna group (e.g., using similar signaling to a bitmap). For instance, an indication of (TPMI1, Null) may indicate a first TPMI index for a first antenna group and no TPMI for a second antenna group (e.g., if the second antenna group is inactive), an indication of (TPMI1, TPMI2) may indicate a first TPMI index for a first antenna group and a second TPMI index for a second antenna group, and an indication of (Null, TPMI3) may indicate no TPMI for a first antenna group and a third TPMI index for a second antenna group. Similarly, an indication of (TPMI0, Null, Null) may indicate a zeroth TPMI index for a first antenna group, and no TPMI for second and third antenna groups, an indication of (TPMI3, Null, TPMI2) may indicate a third TPMI index for a first antenna group, no TPMI for a second antenna group, and a second TPMI index for a third antenna group, and an indication of (TPMI3, TPMI1, TPMI0) may indicate a third TPMI index for a first antenna group, a first TPMI index for a second antenna group, and a zeroth TPMI index for a third antenna group.

Once the UE 115-*a* is able to identify active antenna groups for communications with the base station 105-*a*, the UE 115-*a* may map one or more layers of an uplink message 310 to the active antenna groups for transmission to the base station 105-*a*. That is, the UE 115-*a* may support a layer to antenna group (e.g., subgroup of ports) mapping. In some cases, a UE 115-*a* may perform channel coding, followed by modulation, followed by code word to layer mapping, followed by transform precoding or Discrete Fourier transform (DFT), followed by MIMO precoding, followed by resource element mapping, and followed by waveform generation. In other cases, a processing chain at the UE 115-*a* may be modified to include layer to antenna group mapping. In such cases, the UE 115-*a* may perform channel coding, followed by modulation, followed by code word to layer mapping, followed by layer to antenna group mapping, followed by transform precoding or DFT, followed by MIMO precoding, followed by resource element mapping, and followed by waveform generation.

Figure 5:
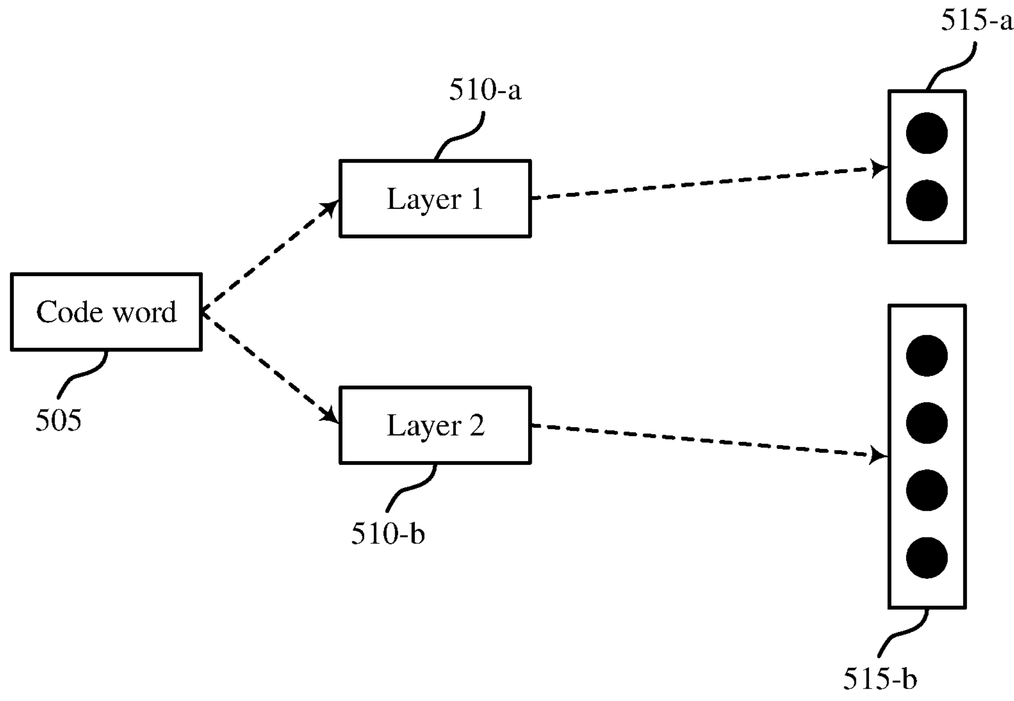
FIG. 5 illustrates an example of layer to antenna group mapping in accordance with aspects of the present disclosure.
Figure 5:

FIG. 5 illustrates an example of layer to antenna group mapping 500 in accordance with aspects of the present disclosure. In the example of FIG. 5, the UE 115-*a* may map a code word 505 to two layers 510 including a first layer 510-*a* and a second layer 510-*b* (e.g., code word to layer mapping). The UE 115-*a* may then map the first layer 510-*a* to a first antenna group 515-*a* (e.g., active subgroup 1 of ports) and the second layer 510-*b* to a second antenna group 515-*b* (e.g., active subgroup 2 of ports). That is, the UE 115-*a* may perform layer to antenna group mapping (e.g., also referred to as layer to subgroup of ports mapping). In some cases, spatial diversity, spatial multiplexing, or both may be supported by layer to antenna group mapping. For instance, if multiple layers are mapped to a single antenna group, the UE 115-*a* may perform spatial multiplexing. Additionally, or alternatively, if a single layer is mapped to multiple antenna groups, the UE 115-*a* may achieve spatial diversity.

Figure 6:
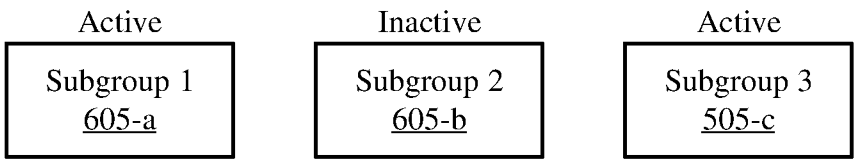
FIG. 6 illustrates an example of details of layer to antenna group mapping in accordance with aspects of the present disclosure.
Figure 6:
Figure 6:
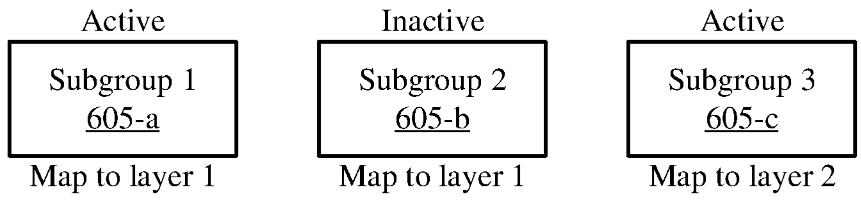

FIG. 6 illustrates an example of details of layer to antenna group mapping 600 in accordance with aspects of the present disclosure. In a first example 600-*a*, the base station 105-*a* may indicate that a first antenna group 605-*a* and a third antenna group 605-*c* are active and a second antenna group 605-*b* is inactive. In a second example 600-*b*, the base station 105-*a* may also indicate that a first antenna group 605-*a* and a third antenna group 605-*c* are active and a second antenna group 605-*b* is inactive, and the base station 105-*a* may indicate a mapping of layers to each antenna group. For instance, the base station 105-*a* may indicate that the UE 115-*a* is to map a first layer to a first antenna group 605-*a* and a second antenna group 605-*b* and may a second layer to a third antenna group 605-*c*. That is, the base station 105-*a* may indicate a mapping rule or a mapping of the layers of an uplink message 310 to active antenna groups. In some cases, the base station 105-*a* may indicate a mapping of layers of an uplink message 310 to an inactive antenna group (e.g., in which case the UE 115-*a* may avoid mapping any of the layers to the inactive antenna group).

In some aspects, the mapping of layers to antenna groups or a mapping rule for mapping layers to antenna groups may be defined at the UE 115-*a*. In one example, if a number of layers L of the uplink message 310 is greater than or equal to a number of active antenna groups N at the UE 115-*a*, the UE 115-*a* may map a layer with index l to an antenna group with index l mod N. In this example, the UE 115-*a* may map multiple layers to a single antenna group (e.g., performing spatial multiplexing). In another example, if a number of layers L of the uplink message 310 is less than a number of active antenna groups N at the UE 115-*a*, the UE 115-*a* may map a layer with index n mod L to an antenna group with index n. In this example, the UE 115-*a* may map a single layer to multiple antenna groups (e.g., achieving spatial diversity). In other aspects, the base station 105-*a* may transmit, to the UE 115-*a*, an indication of the mapping of layers to antenna groups or a mapping rule for mapping layers to antenna groups. That is, the mapping or mapping rule may be indicated by the base station 105-*a* in control signaling (e.g., DCI, MAC-CE, or RRC signaling).

Once the UE 115-*a* maps layers of the uplink message 310 to the active antenna groups, the UE 115-*a* may transmit the uplink message 310 to the base station 105-*a*.

Figure 7:
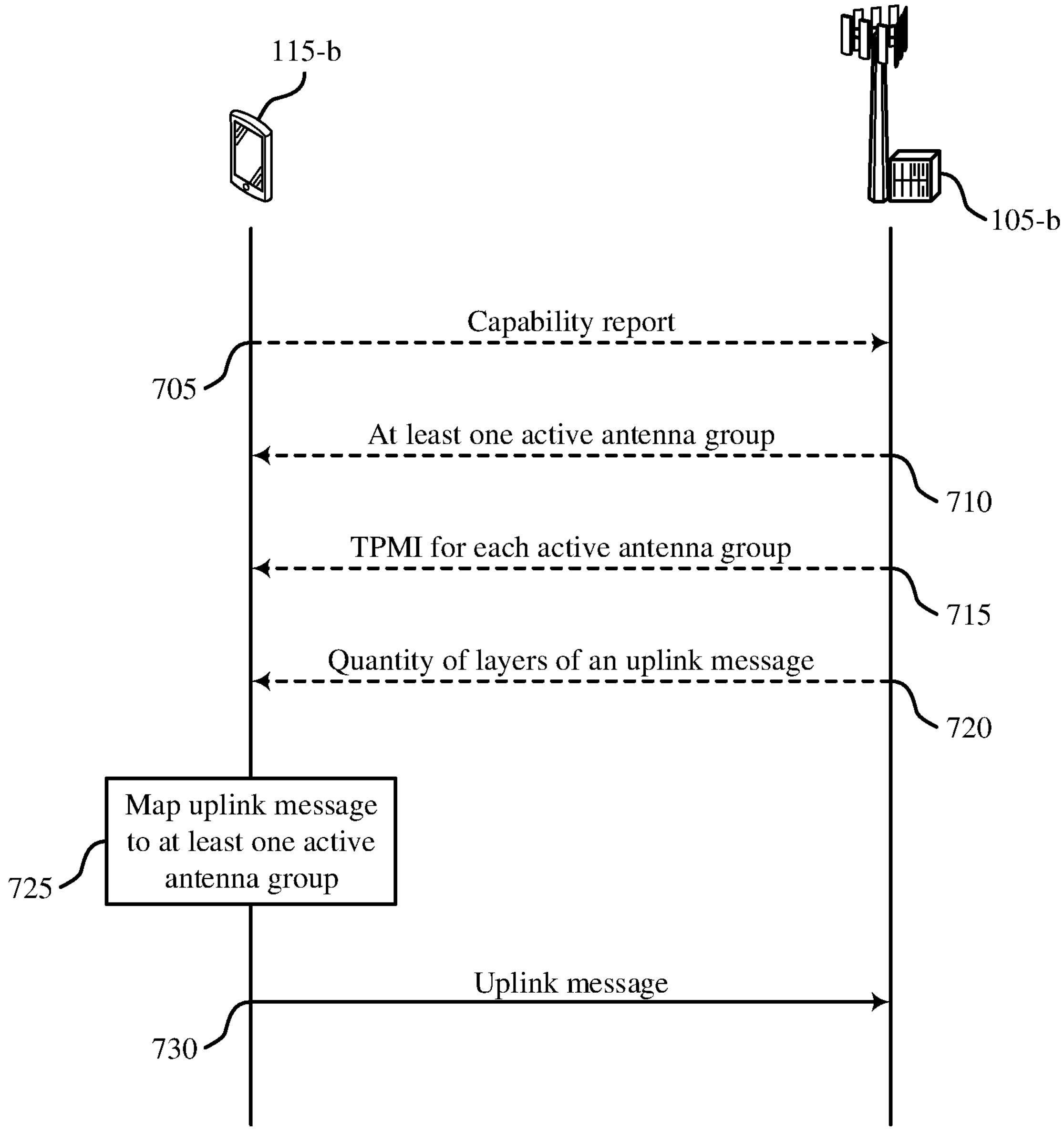
FIG. 7 illustrates an example of a process flow that supports uplink MIMO with different antenna groups in accordance with aspects of the present disclosure.

FIG. 7 illustrates an example of a process flow 700 that supports uplink MIMO with different antenna groups in accordance with aspects of the present disclosure. Process flow 700 includes UE 115-*b*, which may be an example of a UE 115 described with reference to FIGS. 1-6. The UE 115-*b* may be a virtual UE 115 and may include antenna groups (e.g., support communication using antenna groups) at one or more physical UEs 115. Process flow 700 also includes base station 105-*b*, which may be an example of a base station 105 described with reference to FIGS. 1-6. The process flow 700 may implement aspects of wireless communications systems 100 or 300. For example, the process flow 700 may support efficient techniques for facilitating communications with a UE 115 utilizing multiple antenna groups or heterogeneous panels.

In the following description of the process flow 700, the signaling exchanged between UE 115-*b* and base station 105-*b* may be exchanged in a different order than the example order shown, or the operations performed by UE 115-*b* and base station 105-*e* may be performed in different orders or at different times. Some operations may also be omitted from the process flow 700, and other operations may be added to the process flow 700.

At 705, the UE 115-*b* may transmit, and the base station 105-*b* may receive, a capability report indicating one or more antennas in each antenna group in a set of antenna groups. For instance, the UE 115-*b* may indicate antenna groups (e.g., antennas in the antenna groups) available for communications with the base station 105-*b*. In some cases, the UE 115-*b* may also transmit, in the capability report, an indication of whether the UE 115-*b* is capable of performing coherent transmissions using one or more sets of antennas in each antenna group. For instance, the UE 115-*b* may identify which antennas (e.g., within a panel or antenna group) are coherent with each other.

At 710, the base station 105-*b* may transmit, and the UE 115-*b* may receive, an indication of at least one active antenna group of a set of antenna groups for communications with the base station 105-*b*. The base station 105-*b* may transmit, and the UE 115-*b* may receive, the indication of the at least one active antenna group in a DCI message, an RRC message, or a MAC-CE. The UE 115-*b* may include a set of antennas from a set of antenna panels and each of the set of antenna groups may include a subset of the set of antennas. The indication of the at least one active antenna group of the set of antenna groups may include a bitmap indicating the at least one active antenna group of the set of antenna groups. For instance, the bitmap may include a bit for each antenna group, and, if a bit for an antenna group is set to '1', the antenna group may be active for communications with the base station 105-*b*. Otherwise, if a bit for an antenna group is set to '0', the antenna group may be inactive for communications with the base station 105-*b*.

At 715, the base station 105-*b* may transmit, and the UE 115-*b* may receive, a TPMI for each active antenna group of the at least one active antenna group. In some cases, the base station 105-*b* may transmit, and the UE 115-*b* may receive, the TPMI for each active antenna group in a DCI message (e.g., a same DCI message including the indication of the at least one active antenna group). At 720, the base station 105-*b* may transmit, and the UE 115-*b* may receive, an indication of a quantity of one or more layers of an uplink message to transmit to the base station 105-*b*. In some cases, the base station 105-*b* may transmit, and the UE 115-*b* may receive, the indication of the quantity of the one or more layers in a DCI message (e.g., a same DCI message including the indication of the at least one active antenna group, the TPMI for each active antenna group, or both).

At 725, the UE 115-*b* may map the one or more layers of the uplink message (e.g., indicated at 720) to the at least one active antenna group based on receiving the indication of the at least one active antenna group. In some cases, the UE 115-*b* may also precode the one or more layers of the uplink message mapped to each active antenna group based on a respective TPMI associated with the active antenna group. For instance, the UE 115-*b* may identify a precoding matrix for precoding the one or more layers of the uplink message mapped to an antenna group based on a TPMI indicated for the antenna group. The UE 115-*b* may then precode the one or more layers of the uplink message mapped to the antenna group using the identified precoding matrix.

In some aspects, the mapping of the one or more layers of the uplink message (e.g., a mapping rule for the mapping) may be defined at the UE 115-*b*. If a quantity of the one or more layers of the uplink message, L, is greater than or equal to a quantity of the at least one active antenna group, N, the mapping may be based on a mapping rule that maps a layer with index l to an active antenna group with index l mod N. If a quantity of the one or more layers of the uplink message, L, is less than a quantity of the at least one active antenna group, N, and the mapping is based at least in part on a mapping rule that maps an active antenna group with index n to a layer with index n mod L.

In other aspects, the base station 105-*b* may transmit, and the UE 115-*b* may receive, an indication of the mapping of the one or more layers of the uplink message to the at least one active antenna group. For instance, the base station 105-*b* may transmit, and the UE 115-*b* may receive, the indication of the mapping in a DCI message, an RRC message, or a MAC-CE (e.g., a same DCI message including the indication of the at least one active antenna group, the TPMI for each active antenna group, the quantity of the one or more layers, or some combination of these indications). At 730, the UE 115-*b* may transmit, and the base station 105-*b* may receive, the one or more layers of the uplink message using the at least one active antenna group based on the mapping.

Figure 8:
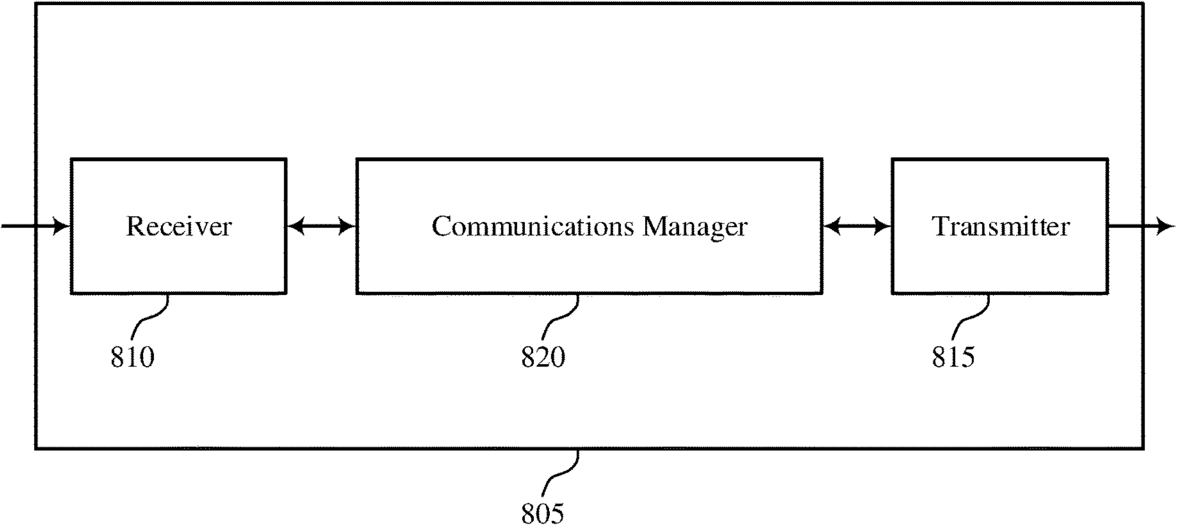
FIGS. 8 and 9 show block diagrams of devices that support uplink MIMO with different antenna groups in accordance with aspects of the present disclosure.

FIG. 8 shows a block diagram 800 of a device 805 that supports uplink MIMO with different antenna groups in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink MIMO with different antenna groups). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink MIMO with different antenna groups). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of uplink MIMO with different antenna groups as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The communications manager 820 may be configured as or otherwise support a means for mapping one or more layers of an uplink message to the at least one active antenna group based on receiving the indication of the at least one active antenna group. The communications manager 820 may be configured as or otherwise support a means for transmitting, to the base station, the one or more layers of the uplink message using the at least one active antenna group based on the mapping.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing and reduced power consumption. In particular, a UE may be able to identify active antenna groups for communications with a base station, and the complexity at the UE associated with coordinating transmissions from these antenna groups may be minimized. In addition, because the UE may communicate with the base station using multiple antenna groups, throughput between the UE and the base station may be improved, resulting in more efficient utilization of communication resources.

Figure 9:
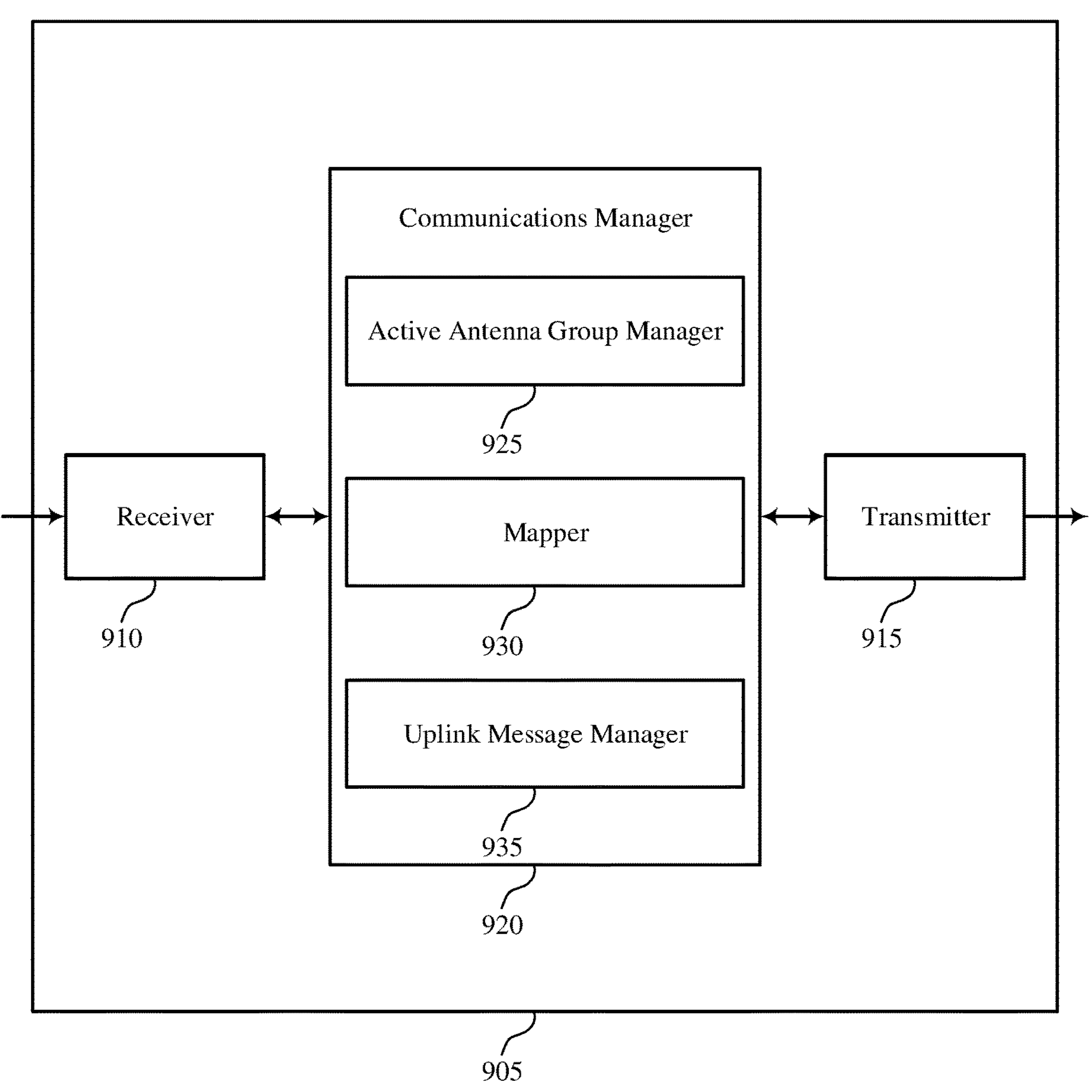

FIG. 9 shows a block diagram 900 of a device 905 that supports uplink MIMO with different antenna groups in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink MIMO with different antenna groups). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink MIMO with different antenna groups). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of uplink MIMO with different antenna groups as described herein. For example, the communications manager 920 may include an active antenna group manager 925, a mapper 930, an uplink message manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The active antenna group manager 925 may be configured as or otherwise support a means for receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The mapper 930 may be configured as or otherwise support a means for mapping one or more layers of an uplink message to the at least one active antenna group based on receiving the indication of the at least one active antenna group. The uplink message manager 935 may be configured as or otherwise support a means for transmitting, to the base station, the one or more layers of the uplink message using the at least one active antenna group based on the mapping.

Figure 10:
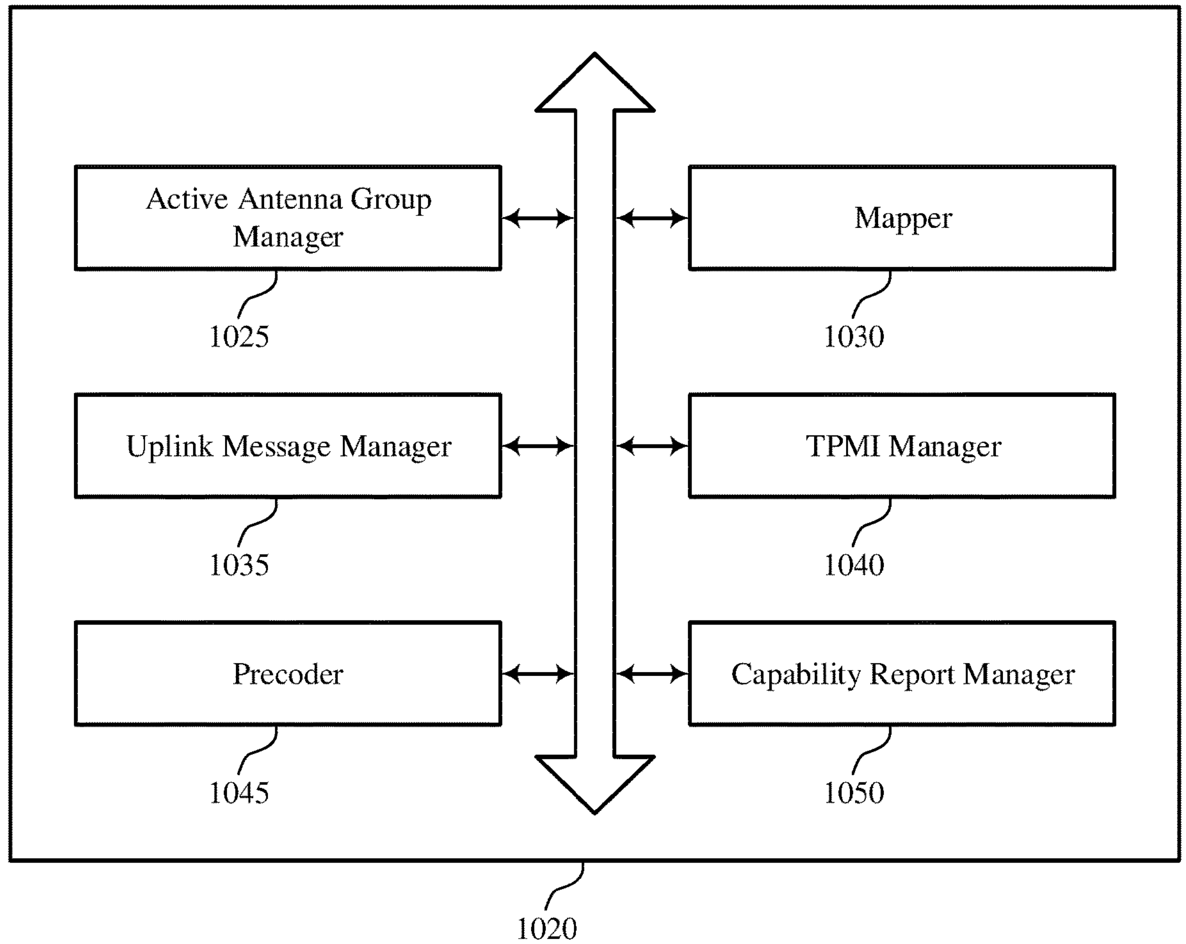
FIG. 10 shows a block diagram of a communications manager that supports uplink MIMO with different antenna groups in accordance with aspects of the present disclosure.

FIG. 10 shows a block diagram 1000 of a communications manager 1020 that supports uplink MIMO with different antenna groups in accordance with aspects of the present disclosure. The communications manager 1020 may be an example of aspects of a communications manager 820, a communications manager 920, or both, as described herein. The communications manager 1020, or various components thereof, may be an example of means for performing various aspects of uplink MIMO with different antenna groups as described herein. For example, the communications manager 1020 may include an active antenna group manager 1025, a mapper 1030, an uplink message manager 1035, a TPMI manager 1040, a precoder 1045, a capability report manager 1050, or any combination thereof. Each of these components may communicate, directly or indirectly, with one another (e.g., via one or more buses).

The communications manager 1020 may support wireless communication at a UE in accordance with examples as disclosed herein. The active antenna group manager 1025 may be configured as or otherwise support a means for receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The mapper 1030 may be configured as or otherwise support a means for mapping one or more layers of an uplink message to the at least one active antenna group based on receiving the indication of the at least one active antenna group. The uplink message manager 1035 may be configured as or otherwise support a means for transmitting, to the base station, the one or more layers of the uplink message using the at least one active antenna group based on the mapping.

In some examples, the TPMI manager 1040 may be configured as or otherwise support a means for receiving, from the base station, a transmit precoding matrix indicator for each active antenna group of the at least one active antenna group. In some examples, the precoder 1045 may be configured as or otherwise support a means for precoding the one or more layers of the uplink message mapped to each active antenna group based on a respective transmit precoding matrix indicator.

In some examples, to support receiving the transmit precoding matrix indicator for each active antenna group, the TPMI manager 1040 may be configured as or otherwise support a means for receiving the transmit precoding matrix indicator for each active antenna group in a downlink control information message.

In some examples, the uplink message manager 1035 may be configured as or otherwise support a means for receiving, from the base station, an indication of a quantity of the one or more layers of the uplink message, where mapping the one or more layers of the uplink message is based on receiving the indication of the quantity of the one or more layers of the uplink message.

In some examples, the capability report manager 1050 may be configured as or otherwise support a means for transmitting, to the base station, a capability report indicating one or more antennas in each of the set of multiple antenna groups, where receiving the indication of the at least one active antenna group is based on transmitting the capability report.

In some examples, the capability report manager 1050 may be configured as or otherwise support a means for transmitting, in the capability report, an indication of whether the UE is capable of performing coherent transmissions using one or more sets of antennas in each antenna group.

In some examples, the mapping of the one or more layers of the uplink message to the at least one active antenna group is defined at the UE.

In some examples, a quantity of the one or more layers of the uplink message, L, is greater than or equal to a quantity of the at least one active antenna group, N, and the mapping is based on a mapping rule that maps a layer with index 1 to an active antenna group with index 1 mod N.

In some examples, a quantity of the one or more layers of the uplink message, L, is less than a quantity of the at least one active antenna group, N, and the mapping is based on a mapping rule that maps an active antenna group with index n to a layer with index n mod L.

In some examples, the mapper 1030 may be configured as or otherwise support a means for receiving an indication of the mapping of the one or more layers of the uplink message to the at least one active antenna group.

In some examples, to support receiving the indication of the mapping rule, the mapper 1030 may be configured as or otherwise support a means for receiving the indication of the mapping in a downlink control information message, a radio resource control message, or a medium access control control element.

In some examples, to support receiving the indication of the at least one active antenna group of the set of multiple antenna groups, the active antenna group manager 1025 may be configured as or otherwise support a means for receiving the indication of the at least one active antenna group of the set of multiple antenna groups in a downlink control information message, a radio resource control message, or a medium access control control element.

In some examples, the indication of the at least one active antenna group of the set of multiple antenna groups includes a bitmap indicating the at least one active antenna group of the set of multiple antenna groups.

In some examples, the UE includes a virtual UE, and the set of multiple antenna groups at the UE includes antenna groups at one or more physical UEs.

Figure 11:
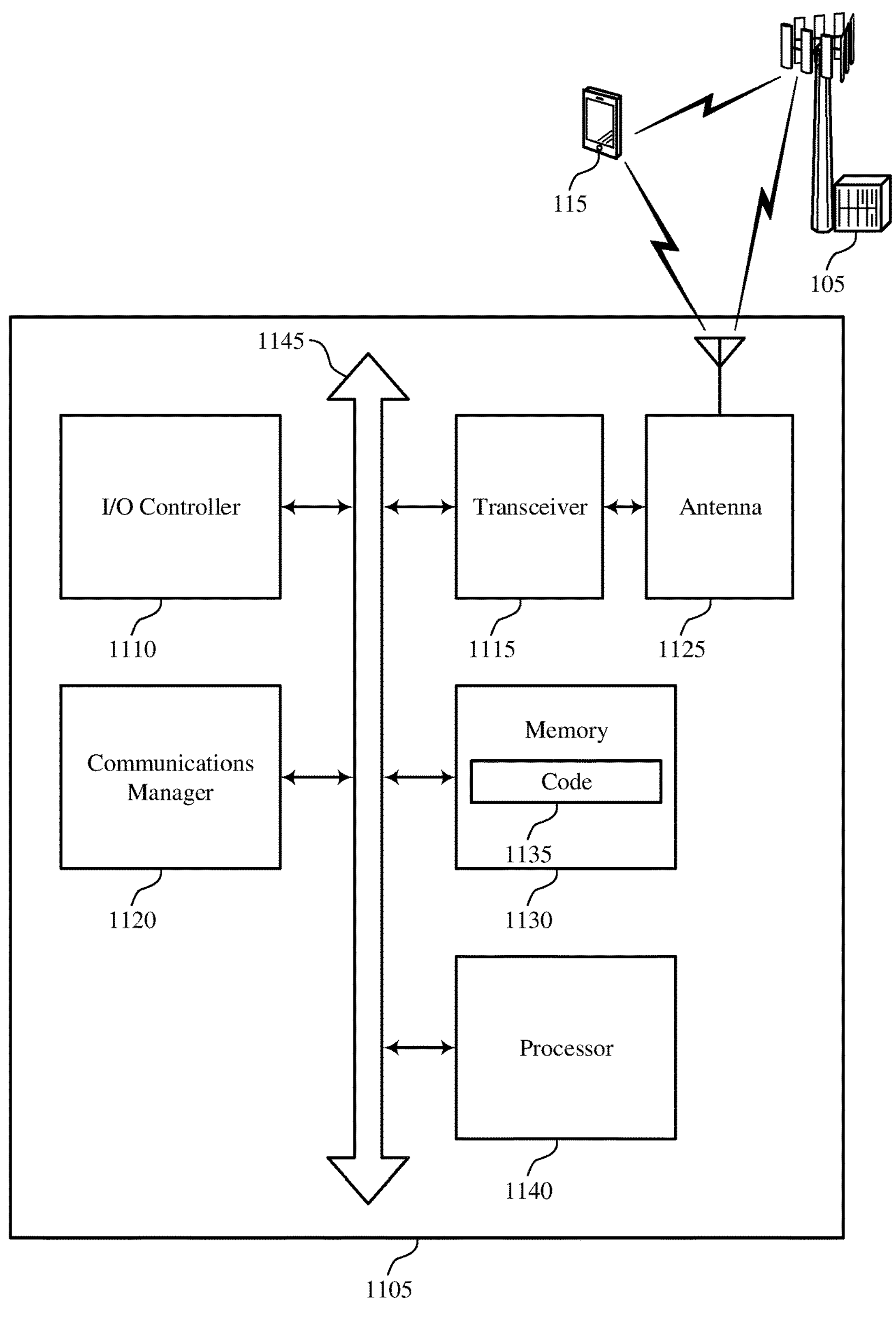
FIG. 11 shows a diagram of a system including a device that supports uplink MIMO with different antenna groups in accordance with aspects of the present disclosure.

FIG. 11 shows a diagram of a system 1100 including a device 1105 that supports uplink MIMO with different antenna groups in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device

1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink MIMO with different antenna groups). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The communications manager 1120 may be configured as or otherwise support a means for mapping one or more layers of an uplink message to the at least one active antenna group based on receiving the indication of the at least one active antenna group. The communications manager 1120 may be configured as or otherwise support a means for transmitting, to the base station, the one or more layers of the uplink message using the at least one active antenna group based on the mapping.

By including or configuring the communications manager 1120 in accordance with examples as described herein, the device 1105 may support techniques for reduced processing and reduced power consumption. In particular, a UE may be able to identify active antenna groups for communications with a base station, and the complexity at the UE associated with coordinating transmissions from these antenna groups may be minimized. In addition, because the UE may communicate with the base station using multiple antenna groups, throughput between the UE and the base station may be improved, resulting in more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of uplink MIMO with different antenna groups as described herein, or the processor 1140 and the memory 1130 may be otherwise configured to perform or support such operations.

Figure 12:
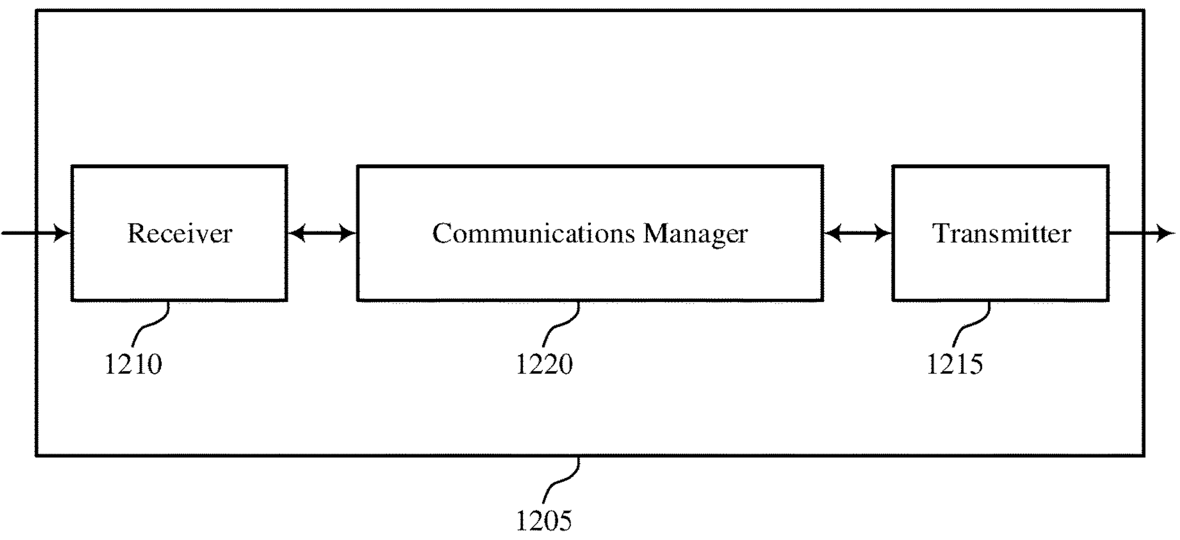
FIGS. 12 and 13 show block diagrams of devices that support uplink MIMO with different antenna groups in accordance with aspects of the present disclosure.

FIG. 12 shows a block diagram 1200 of a device 1205 that supports uplink MIMO with different antenna groups in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to uplink MIMO with different antenna groups). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to uplink MIMO with different antenna groups). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of uplink MIMO with different antenna groups as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The communications manager 1220 may be configured as or otherwise support a means for receiving, from the UE, one or more layers of an uplink message mapped to the at least one active antenna group based on transmitting the indication of the at least one active antenna group.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced processing and reduced power consumption. In particular, a UE may be able to identify active antenna groups for communications with a base station, and the complexity at the UE associated with coordinating transmissions from these antenna groups may be minimized. In addition, because the UE may communicate with the base station using multiple antenna groups, throughput between the UE and the base station may be improved, resulting in more efficient utilization of communication resources.

Figure 13:
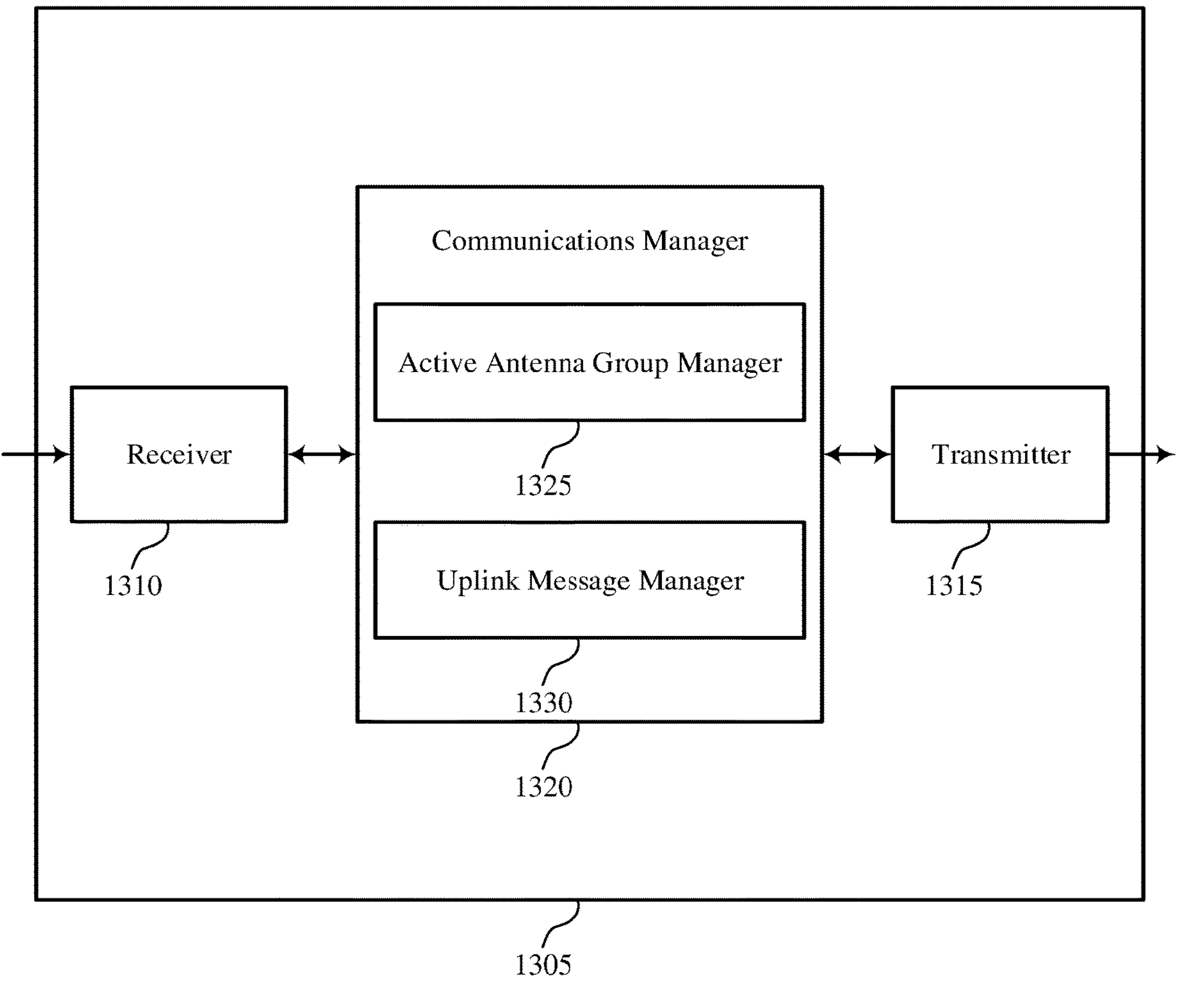
Figure 13:

FIG. 13 shows a block diagram 1300 of a device 1305 that supports uplink MIMO with different antenna groups in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to uplink MIMO with different antenna groups). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to uplink MIMO with different antenna groups). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of uplink MIMO with different antenna groups as described herein. For example, the communications manager 1320 may include an active antenna group manager 1325 an uplink message manager 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The active antenna group manager 1325 may be configured as or otherwise support a means for transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The uplink message manager 1330 may be configured as or otherwise support a means for receiving, from the UE, one or more layers of an uplink message mapped to the at least one active antenna group based on transmitting the indication of the at least one active antenna group.

Figure 14:
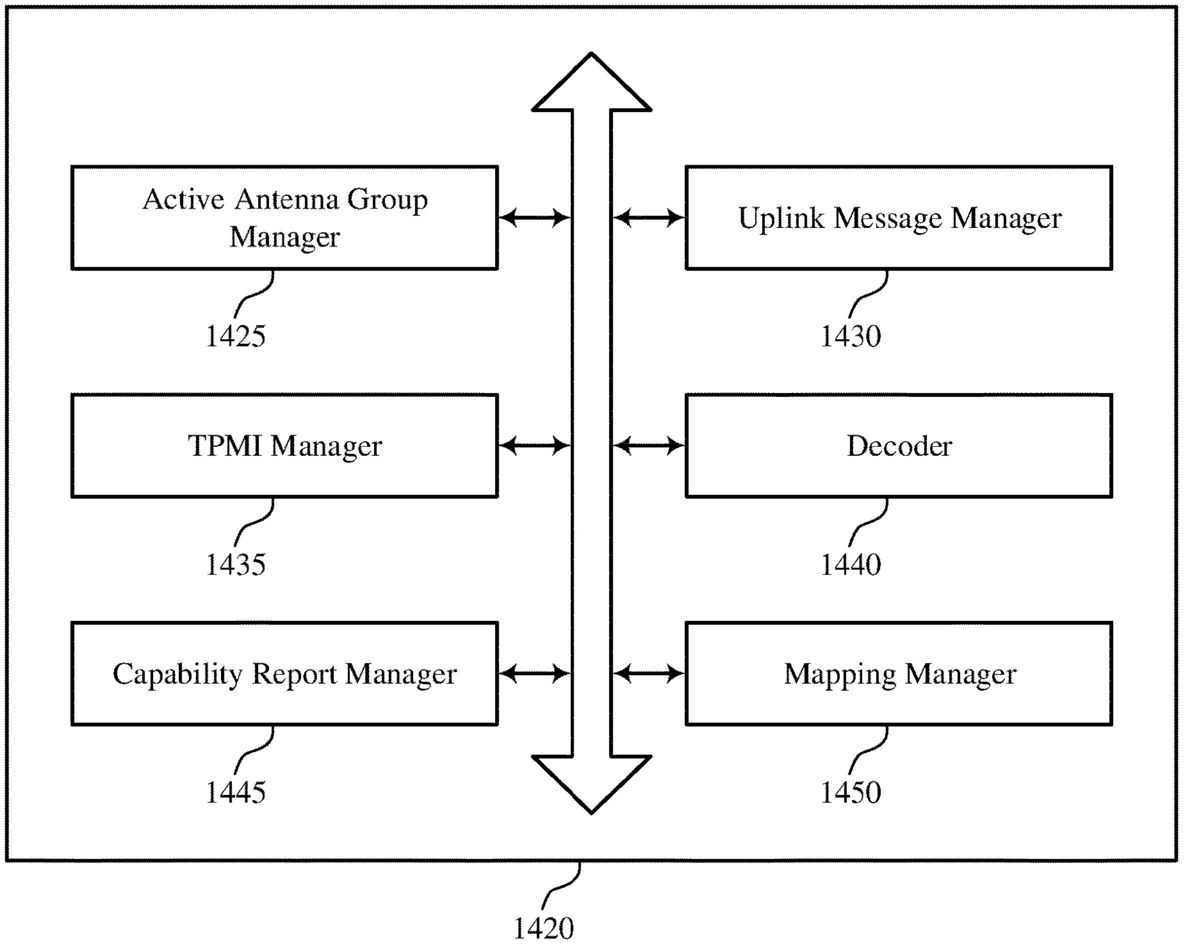
FIG. 14 shows a block diagram of a communications manager that supports uplink MIMO with different antenna groups in accordance with aspects of the present disclosure.

FIG. 14 shows a block diagram 1400 of a communications manager 1420 that supports uplink MIMO with different antenna groups in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of uplink MIMO with different antenna groups as described herein. For example, the communications manager 1420 may include an active antenna group manager 1425, an uplink message manager 1430, a TPMI manager 1435, a decoder 1440, a capability report manager 1445, a mapping manager 1450, or any combination thereof. Each of these components may communicate, directly or indirectly, with one another (e.g., via one or more buses).

The communications manager 1420 may support wireless communication at a base station in accordance with examples as disclosed herein. The active antenna group manager 1425 may be configured as or otherwise support a means for transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The uplink message manager 1430 may be configured as or otherwise support a means for receiving, from the UE, one or more layers of an uplink message mapped to the at least one active antenna group based on transmitting the indication of the at least one active antenna group.

In some examples, the TPMI manager 1435 may be configured as or otherwise support a means for transmitting, to the UE, a transmit precoding matrix indicator for each active antenna group of the at least one active antenna group. In some examples, the decoder 1440 may be configured as or otherwise support a means for decoding the one or more layers of the uplink message mapped to each active antenna group based on a respective transmit precoding matrix indicator.

In some examples, to support transmitting the transmit precoding matrix indicator for each active antenna group, the TPMI manager 1435 may be configured as or otherwise support a means for transmitting the transmit precoding matrix indicator for each active antenna group in a downlink control information message.

In some examples, the uplink message manager 1430 may be configured as or otherwise support a means for transmitting, to the UE, an indication of a quantity of the one or more layers of the uplink message, where receiving the one or more layers of the uplink message is based on transmitting the indication of the quantity of the one or more layers of the uplink message.

In some examples, the capability report manager 1445 may be configured as or otherwise support a means for receiving, from the UE, a capability report indicating one or more antennas in each of the set of multiple antenna groups, where transmitting the indication of the at least one active antenna group is based on receiving the capability report.

In some examples, the capability report manager 1445 may be configured as or otherwise support a means for receiving, in the capability report, an indication of whether the UE is capable of performing coherent transmissions using one or more sets of antennas in each antenna group.

In some examples, the mapping manager 1450 may be configured as or otherwise support a means for transmitting an indication of a mapping of the one or more layers of the uplink message to the at least one active antenna group.

In some examples, to support transmitting the indication of the mapping rule, the mapping manager 1450 may be configured as or otherwise support a means for transmitting the indication of the mapping in a downlink control information message, a radio resource control message, or a medium access control control element.

In some examples, to support transmitting the indication of the at least one active antenna group of the set of multiple antenna groups, the active antenna group manager 1425 may be configured as or otherwise support a means for transmitting the indication of the at least one active antenna group of the set of multiple antenna groups in a downlink control information message, a radio resource control message, or a medium access control control element.

In some examples, the indication of the at least one active antenna group of the set of multiple antenna groups includes a bitmap indicating the at least one active antenna group of the set of multiple antenna groups.

In some examples, the UE includes a virtual UE, and the set of multiple antenna groups at the UE includes antenna groups at one or more physical UEs.

Figure 15:
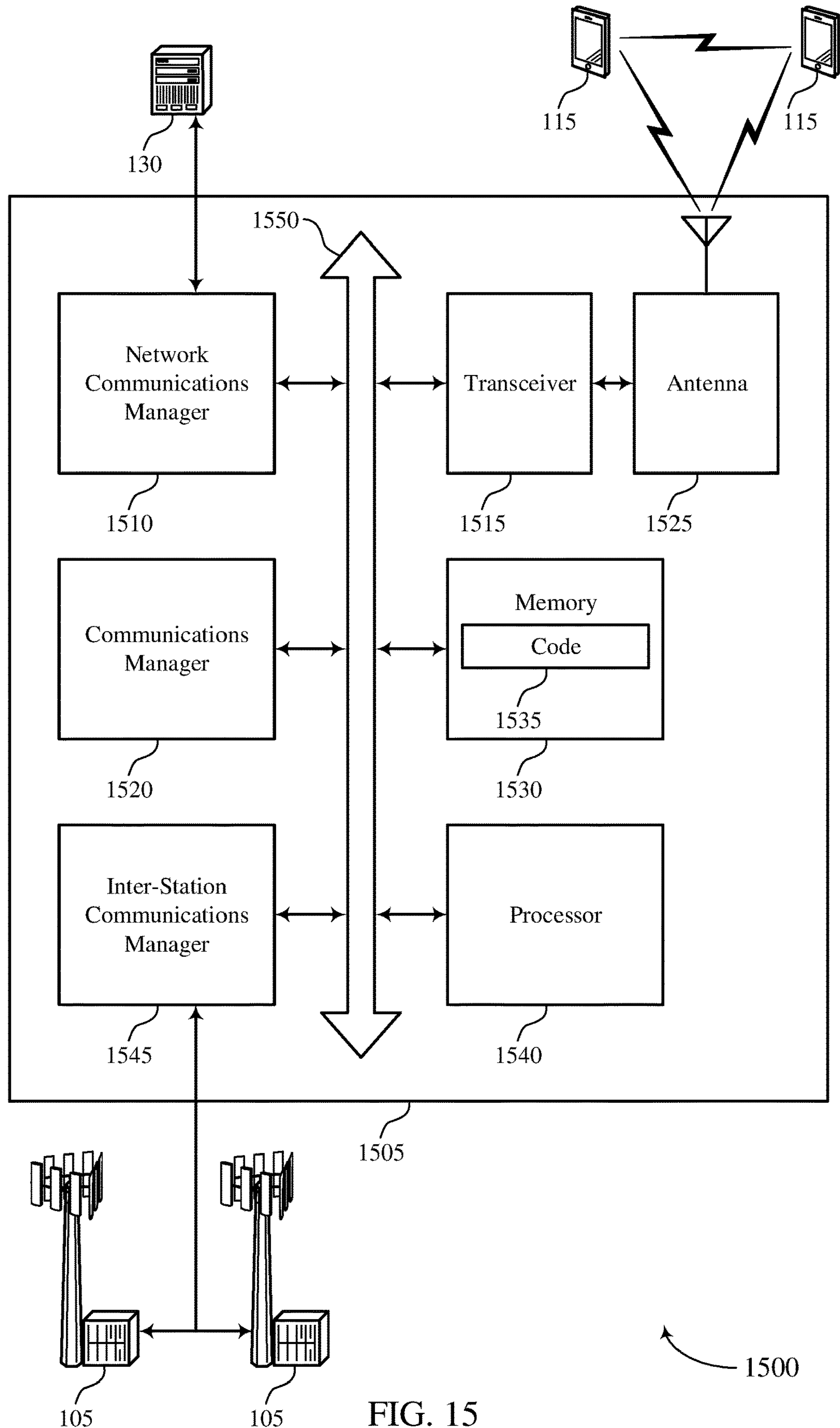
FIG. 15 shows a diagram of a system including a device that supports uplink MIMO with different antenna groups in accordance with aspects of the present disclosure.

FIG. 15 shows a diagram of a system 1500 including a device 1505 that supports uplink MIMO with different antenna groups in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory.

In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting uplink MIMO with different antenna groups). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The communications manager 1520 may be configured as or otherwise support a means for receiving, from the UE, one or more layers of an uplink message mapped to the at least one active antenna group based on transmitting the indication of the at least one active antenna group.

By including or configuring the communications manager 1520 in accordance with examples as described herein, the device 1505 may support techniques for reduced processing and reduced power consumption. In particular, a UE may be able to identify active antenna groups for communications with a base station, and the complexity at the UE associated with coordinating transmissions from these antenna groups may be minimized. In addition, because the UE may communicate with the base station using multiple antenna groups, throughput between the UE and the base station may be improved, resulting in more efficient utilization of communication resources.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of uplink MIMO with different antenna groups as described herein, or the processor 1540 and the memory 1530 may be otherwise configured to perform or support such operations.

Figure 16:
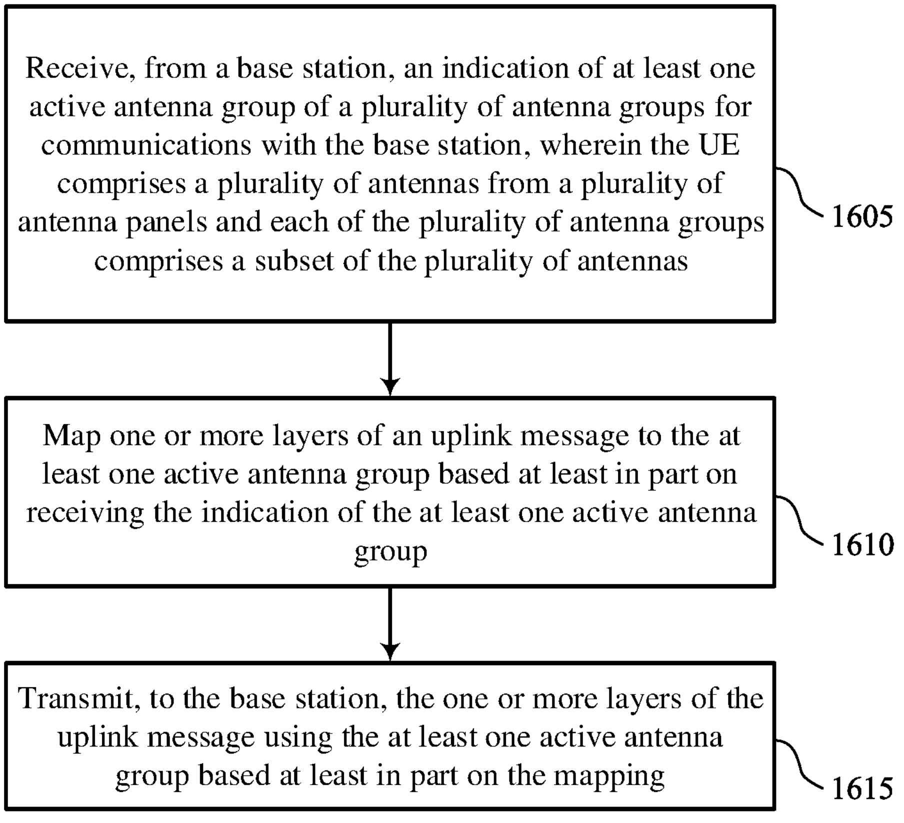

FIG. 16 shows a flowchart illustrating a method 1600 that supports uplink MIMO with different antenna groups in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The operations of 1605 may be performed in accordance with examples as disclosed herein. In some examples, aspects of the operations of 1605 may be performed by an active antenna group manager 1025 as described with reference to FIG. 10.

At 1610, the method may include mapping one or more layers of an uplink message to the at least one active antenna group based on receiving the indication of the at least one active antenna group. The operations of 1610 may be performed in accordance with examples as disclosed herein. In some examples, aspects of the operations of 1610 may be performed by a mapper 1030 as described with reference to FIG. 10.

At 1615, the method may include transmitting, to the base station, the one or more layers of the uplink message using the at least one active antenna group based on the mapping. The operations of 1615 may be performed in accordance with examples as disclosed herein. In some examples, aspects of the operations of 1615 may be performed by an uplink message manager 1035 as described with reference to FIG. 10.

FIG. 17 shows a flowchart illustrating a method 1700 that supports uplink MIMO with different antenna groups in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, an indication of at least one active antenna group of a set of multiple antenna groups for communications with the base station, where the UE includes a set of multiple antennas from a set of multiple antenna panels and each of the set of multiple antenna groups includes a subset of the set of multiple antennas. The operations of 1705 may be performed in accordance with examples as disclosed herein. In some examples, aspects of the operations of 1705 may be performed by an active antenna group manager 1425 as described with reference to FIG. 14.

At 1710, the method may include receiving, from the UE, one or more layers of an uplink message mapped to the at least one active antenna group based on transmitting the indication of the at least one active antenna group. The operations of 1710 may be performed in accordance with examples as disclosed herein. In some examples, aspects of the operations of 1710 may be performed by an uplink message manager 1430 as described with reference to FIG. 14.

The following provides an overview of aspects of the present disclosure:

Aspect 1: A method for wireless communication at a UE, comprising: receiving, from a base station, an indication of at least one active antenna group of a plurality of antenna groups for communications with the base station, wherein the UE comprises a plurality of antennas from a plurality of antenna panels and each of the plurality of antenna groups comprises a subset of the plurality of antennas; mapping one or more layers of an uplink message to the at least one active antenna group based at least in part on receiving the indication of the at least one active antenna group; and transmitting, to the base station, the one or more layers of the uplink message using the at least one active antenna group based at least in part on the mapping.

Aspect 2: The method of aspect 1, further comprising: receiving, from the base station, a transmit precoding matrix indicator for each active antenna group of the at least one active antenna group; and precoding the one or more layers of the uplink message mapped to each active antenna group based at least in part on a respective transmit precoding matrix indicator.

Aspect 3: The method of aspect 2, wherein receiving the transmit precoding matrix indicator for each active antenna group comprises: receiving the transmit precoding matrix indicator for each active antenna group in a downlink control information message.

Aspect 4: The method of any of aspects 1 through 3, further comprising: receiving, from the base station, an indication of a quantity of the one or more layers of the uplink message, wherein mapping the one or more layers of the uplink message is based at least in part on receiving the indication of the quantity of the one or more layers of the uplink message.

Aspect 5: The method of any of aspects 1 through 4, further comprising: transmitting, to the base station, a capability report indicating one or more antennas in each of the plurality of antenna groups, wherein receiving the indication of the at least one active antenna group is based at least in part on transmitting the capability report.

Aspect 6: The method of aspect 5, further comprising: transmitting, in the capability report, an indication of whether the UE is capable of performing coherent transmissions using one or more sets of antennas in each antenna group.

Aspect 7: The method of any of aspects 1 through 6, wherein the mapping of the one or more layers of the uplink message to the at least one active antenna group is defined at the UE.

Aspect 8: The method of aspect 7, wherein a quantity of the one or more layers of the uplink message, L, is greater than or equal to a quantity of the at least one active antenna group, N, and the mapping is based at least in part on a mapping rule that maps a layer with index 1 to an active antenna group with index 1 mod N.

Aspect 9: The method of any of aspects 7 through 8, wherein a quantity of the one or more layers of the uplink message, L, is less than a quantity of the at least one active antenna group, N, and the mapping is based at least in part on a mapping rule that maps an active antenna group with index n to a layer with index n mod L.

Aspect 10: The method of any of aspects 1 through 9, further comprising: receiving an indication of the mapping of the one or more layers of the uplink message to the at least one active antenna group.

Aspect 11: The method of aspect 10, wherein receiving the indication of the mapping rule comprises: receiving the indication of the mapping in a downlink control information message, a radio resource control message, or a medium access control control element.

Aspect 12: The method of any of aspects 1 through 11, wherein receiving the indication of the at least one active antenna group of the plurality of antenna groups comprises: receiving the indication of the at least one active antenna group of the plurality of antenna groups in a downlink control information message, a radio resource control message, or a medium access control control element.

Aspect 13: The method of any of aspects 1 through 12, wherein the indication of the at least one active antenna group of the plurality of antenna groups comprises a bitmap indicating the at least one active antenna group of the plurality of antenna groups.

Aspect 14: The method of any of aspects 1 through 13, wherein the UE comprises a virtual UE, and the plurality of antenna groups at the UE comprises antenna groups at one or more physical UEs.

Aspect 15: A method for wireless communication at a base station, comprising: transmitting, to a UE, an indication of at least one active antenna group of a plurality of antenna groups for communications with the base station, wherein the UE comprises a plurality of antennas from a plurality of antenna panels and each of the plurality of antenna groups comprises a subset of the plurality of antennas; and receiving, from the UE, one or more layers of an uplink message mapped to the at least one active antenna group based at least in part on transmitting the indication of the at least one active antenna group.

Aspect 16: The method of aspect 15, further comprising: transmitting, to the UE, a transmit precoding matrix indicator for each active antenna group of the at least one active antenna group; and decoding the one or more layers of the uplink message mapped to each active antenna group based at least in part on a respective transmit precoding matrix indicator.

Aspect 17: The method of aspect 16, wherein transmitting the transmit precoding matrix indicator for each active antenna group comprises: transmitting the transmit precoding matrix indicator for each active antenna group in a downlink control information message.

Aspect 18: The method of any of aspects 15 through 17, further comprising: transmitting, to the UE, an indication of a quantity of the one or more layers of the uplink message, wherein receiving the one or more layers of the uplink message is based at least in part on transmitting the indication of the quantity of the one or more layers of the uplink message.

Aspect 19: The method of any of aspects 15 through 18, further comprising: receiving, from the UE, a capability report indicating one or more antennas in each of the plurality of antenna groups, wherein transmitting the indication of the at least one active antenna group is based at least in part on receiving the capability report.

Aspect 20: The method of aspect 19, further comprising: receiving, in the capability report, an indication of whether the UE is capable of performing coherent transmissions using one or more sets of antennas in each antenna group.

Aspect 21: The method of any of aspects 15 through 20, further comprising: transmitting an indication of a mapping of the one or more layers of the uplink message to the at least one active antenna group.

Aspect 22: The method of aspect 21, wherein transmitting the indication of the mapping rule comprises: transmitting the indication of the mapping in a downlink control information message, a radio resource control message, or a medium access control control element.

Aspect 23: The method of any of aspects 15 through 22, wherein transmitting the indication of the at least one active antenna group of the plurality of antenna groups comprises: transmitting the indication of the at least one active antenna group of the plurality of antenna groups in a downlink control information message, a radio resource control message, or a medium access control control element.

Aspect 24: The method of any of aspects 15 through 23, wherein the indication of the at least one active antenna group of the plurality of antenna groups comprises a bitmap indicating the at least one active antenna group of the plurality of antenna groups.

Aspect 25: The method of any of aspects 15 through 24, wherein the UE comprises a virtual UE, and the plurality of antenna groups at the UE comprises antenna groups at one or more physical UEs.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a base station, comprising a processor; memory coupled with the processor; and instructions stored in the memory and executable by the processor to cause the apparatus to perform a method of any of aspects 15 through 25.

Aspect 30: An apparatus for wireless communication at a base station, comprising at least one means for performing a method of any of aspects 15 through 25.

Aspect 31: A non-transitory computer-readable medium storing code for wireless communication at a base station, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication performed by a user equipment (UE), the method comprising:

receiving, from a base station, an indication of at least one active antenna port group of a plurality of antenna port groups, wherein the plurality of antenna port groups comprises a first antenna port group and a second antenna port group, wherein the indication comprising a first indication indicates that the first antenna port group is the at least one active antenna port group, and wherein the indication comprising a second indication indicates that the second antenna port group is the at least one active antenna port group; and mapping one or more layers of an uplink message to the at least one active antenna port group based at least in part on the indication of the at least one active antenna port group.

2. The method of claim 1, wherein receiving the indication comprises receiving a respective transmit precoding matrix indicator (TPMI) for each active antenna port group of the at least one active antenna port group.

3. The method of claim 2, wherein receiving the respective TPMI for each active antenna port group comprises:

receiving the respective TPMI for each active antenna port group in a downlink control information message.

4. The method of claim 1, further comprising:

receiving, from the base station, an indication of a quantity of the one or more layers of the uplink message, wherein mapping the one or more layers of the uplink message is based at least in part on the indication of the quantity of the one or more layers of the uplink message.

5. The method of claim 1, further comprising:

transmitting, to the base station, a capability report indicating one or more antennas in each of the plurality of antenna port groups, wherein receiving the indication of the at least one active antenna port group is based at least in part on transmitting the capability report.

6. The method of claim 5, further comprising:

transmitting, in the capability report, an indication of whether the UE is qualified of performing coherent transmissions utilizing one or more sets of antennas in each antenna port group.

7. The method of claim 1, wherein the mapping of the one or more layers of the uplink message to the at least one active antenna port group is defined at the UE.

8. The method of claim 7, wherein a quantity of the one or more layers of the uplink message, L, is greater than or equal to a quantity of the at least one active antenna port group, N, and the mapping is based at least in part on a mapping rule that maps a layer with index i to an active antenna port group with index i mod N.

9. The method of claim 7, wherein a quantity of the one or more layers of the uplink message, L, is less than a quantity of the at least one active antenna port group, N, and the mapping is based at least in part on a mapping rule that maps an active antenna port group with index n to a layer with index n mod L.

10. The method of claim 1, further comprising:
receiving an indication of the mapping of the one or more layers of the uplink message to the at least one active antenna port group.

11. The method of claim 10, wherein receiving the indication of the mapping comprises:
receiving the indication of the mapping in a downlink control information message, a radio resource control message, or a medium access control control element.

12. The method of claim 1, wherein receiving the indication of the at least one active antenna port group of the plurality of antenna port groups comprises:
receiving the indication of the at least one active antenna port group of the plurality of antenna port groups in a downlink control information message, a radio resource control message, or a medium access control control element.

13. The method of claim 1, wherein the indication of the at least one active antenna port group of the plurality of antenna port groups comprises a bitmap indicating the at least one active antenna port group of the plurality of antenna port groups.

14. The method of claim 1, wherein the UE comprises a virtual UE, and the plurality of antenna port groups at the UE comprises antenna port groups at one or more physical UEs.

15. The method of claim 1, further comprising:
transmitting, to the base station, the uplink message.

16. The method of claim 1, wherein the indication comprises a transmit precoding matrix indicator (TPMI).

17. The method of claim 1, wherein the indication comprises a respective transmit precoding matrix indicator (TPMI) for each active antenna port group of the at least one active antenna port group.

18. A method of wireless communication performed by a base station, the method comprising:
transmitting, to a user equipment (UE), an indication of at least one active antenna port group of a plurality of antenna port groups, wherein the plurality of antenna port groups comprises a first antenna port group and a second antenna port group, wherein the indication comprising a first indication indicates that the first antenna port group is the at least one active antenna port group, and wherein the indication comprising a second indication indicates that the second antenna port group is the at least one active antenna port group; and
receiving, from the UE, one or more layers of an uplink message mapped to the at least one active antenna port group based at least in part on the indication of the at least one active antenna port group.

19. The method of claim 18, wherein transmitting the indication comprises transmitting a respective transmit precoding matrix indicator (TPMI) for each active antenna port group of the at least one active antenna port group.

20. The method of claim 19, wherein transmitting the respective TPMI for each active antenna port group comprises:
transmitting the respective TPMI for each active antenna port group in a downlink control information message.

21. The method of claim 18, further comprising:
transmitting, to the UE, an indication of a quantity of the one or more layers of the uplink message, wherein receiving the one or more layers of the uplink message is based at least in part on the indication of the quantity of the one or more layers of the uplink message.

22. The method of claim 18, further comprising:
receiving, from the UE, a capability report indicating one or more antennas in each of the plurality of antenna port groups, wherein transmitting the indication of the at least one active antenna port group is based at least in part on receiving the capability report.

23. The method of claim 22, further comprising:
receiving, in the capability report, an indication of whether the UE is qualified of performing coherent transmissions utilizing one or more sets of antennas in each antenna port group.

24. The method of claim 18, further comprising:
transmitting an indication of a mapping of the one or more layers of the uplink message to the at least one active antenna port group.

25. The method of claim 24, wherein transmitting the indication of the mapping comprises:
transmitting the indication of the mapping in a downlink control information message, a radio resource control message, or a medium access control control element.

26. The method of claim 18, wherein transmitting the indication of the at least one active antenna port group of the plurality of antenna port groups comprises:
transmitting the indication of the at least one active antenna port group of the plurality of antenna port groups in a downlink control information message, a radio resource control message, or a medium access control control element.

27. The method of claim 18, wherein the indication of the at least one active antenna port group of the plurality of antenna port groups comprises a bitmap indicating the at least one active antenna port group of the plurality of antenna port groups.

28. The method of claim 18, wherein the UE comprises a virtual UE, and the plurality of antenna port groups at the UE comprises antenna port groups at one or more physical UEs.

29. An apparatus for wireless communication at a user equipment (UE), the apparatus comprising:
a processor;
memory coupled with the processor; and
instructions stored in the memory and executable by the processor to cause the apparatus to:
receive, from a base station, an indication of at least one active antenna port group of a plurality of antenna port groups, wherein the plurality of antenna port groups comprises a first antenna port group and a second antenna port group, wherein the indication comprising a first indication indicates that the first antenna port group is the at least one active antenna port group, and wherein the indication comprising a second indication indicates that the second antenna port group is the at least one active antenna port group; and
map one or more layers of an uplink message to the at least one active antenna port group based at least in part on the indication of the at least one active antenna port group.

30. The apparatus of claim 29, wherein, to receive the indication, the instructions are further executable by the processor to cause the apparatus to:
receive a respective transmit precoding matrix indicator (TPMI) for each active antenna port group of the at least one active antenna port group.

31. The apparatus of claim 29, wherein the instructions are further executable by the processor to cause the apparatus to:
transmit, to the base station, a capability report indicating one or more antennas in each of the plurality of antenna port groups, wherein receiving the indication of the at least one active antenna port group is based at least in part on transmitting the capability report.

32. The apparatus of claim 29, wherein the instructions are further executable by the processor to cause the apparatus to:

transmit, to the base station, the uplink message.

33. The apparatus of claim 29, wherein the indication comprises a transmit precoding matrix indicator (TPMI).

34. The apparatus of claim 29, wherein the indication comprises a respective transmit precoding matrix indicator (TPMI) for each active antenna port group of the at least one active antenna port group.

35. An apparatus for wireless communication at a base station, the apparatus comprising:

a processor;

memory coupled with the processor; and instructions stored in the memory and executable by the processor to cause the apparatus to:

transmit, to a user equipment (UE), an indication of at least one active antenna port group of a plurality of antenna port groups the plurality of antenna port groups comprises a first antenna port group and a second port antenna port group, wherein the indication comprising a first indication indicates that the first antenna port group is the at least one active antenna port group, and wherein the indication comprising a second indication indicates that the second antenna port group is the at least one active antenna port group; and receive, from the UE, one or more layers of an uplink message mapped to the at least one active antenna port group based at least in part on the indication of the at least one active antenna port group.

36. The apparatus of claim 35, wherein, to transmit the indication, the instructions are further executable by the processor to cause the apparatus to:

transmit a respective transmit precoding matrix indicator (TPMI) for each active antenna port group of the at least one active antenna port group.

* * * * *